US012336653B2

(12) United States Patent
Upston et al.

(10) Patent No.: US 12,336,653 B2
(45) Date of Patent: Jun. 24, 2025

(54) SOUS VIDE DEVICE

(71) Applicant: BREVILLE PTY LIMITED, Alexandria (AU)

(72) Inventors: Gregory Upston, Alexandria (AU); Vyvyan Rose, Alexandria (AU); Brendan Foxlee, Alexandria (AU)

(73) Assignee: BREVILLE PTY LIMITED, Alexandria (AU)

( * ) Notice: Subject to any disclaimer, the term of this patent is extended or adjusted under 35 U.S.C. 154(b) by 188 days.

(21) Appl. No.: 18/099,515

(22) Filed: Jan. 20, 2023

(65) Prior Publication Data
US 2023/0148782 A1   May 18, 2023

Related U.S. Application Data

(63) Continuation of application No. 16/636,000, filed as application No. PCT/AU2018/000156 on Aug. 29, 2018, now Pat. No. 11,612,267.

(30) Foreign Application Priority Data

Sep. 6, 2017   (AU) ................................ 2017903600

(51) Int. Cl.
*A47J 27/10* (2006.01)
*A47J 36/16* (2006.01)
(Continued)

(52) U.S. Cl.
CPC ............. *A47J 27/10* (2013.01); *A47J 36/165* (2013.01); *A47J 36/32* (2013.01); *H05B 1/0202* (2013.01);
(Continued)

(58) Field of Classification Search
CPC ..... A47J 27/10; A47J 36/165; H05B 3/78–82; F24H 9/001; F24H 9/0015; H01B 1/0269
See application file for complete search history.

(56) References Cited

U.S. PATENT DOCUMENTS

| 6,032,481 A | 3/2000 | Mosby |
| 10,383,477 B2 | 8/2019 | Payen et al. |

(Continued)

FOREIGN PATENT DOCUMENTS

| CN | 1086383 A | 5/1994 |
| CN | 1649535 A | 8/2005 |

(Continued)

OTHER PUBLICATIONS

Extended European Search Report for EP Application No. 24181486. 2, dated Sep. 10, 2024, 7 pages.

*Primary Examiner* — John J Norton
(74) *Attorney, Agent, or Firm* — KDW FIRM PLLC

(57) ABSTRACT

A sous vide device (100) including an outer housing (104) within which there is located a heated tube (448) surrounding inner tubular wall (311), with the inner tubular wall (311) providing a first duct (461), and a second duct (462) being provided between the inner tubular wall and outer tubular wall with the first duct (461) and second duct (462) co-operating to provide a fluid flow path extending from an inlet (107) to an outlet (106), with vanes (450) being attached to the inner tubular wall (311) so as to be rotatably driven thereby to cause the liquid to pass along the fluid flow path.

22 Claims, 23 Drawing Sheets

(51) Int. Cl.
*A47J 36/32* (2006.01)
*H05B 1/02* (2006.01)
*H05B 3/80* (2006.01)

(52) U.S. Cl.
CPC ............ *H05B 1/0269* (2013.01); *H05B 3/80* (2013.01); *A47J 2202/00* (2013.01)

(56) References Cited

U.S. PATENT DOCUMENTS

| | | |
|---|---|---|
| 2004/0256375 A1 | 12/2004 | Loktev |
| 2008/0179311 A1* | 7/2008 | Koro ................ A47J 36/2416 |
| | | 219/430 |
| 2009/0151891 A1 | 6/2009 | Li et al. |
| 2013/0220143 A1 | 8/2013 | Fetterman |
| 2015/0150403 A1 | 6/2015 | Wu |
| 2018/0049580 A1 | 2/2018 | Wu |
| 2019/0124722 A1* | 4/2019 | Young ..................... H05B 3/44 |

FOREIGN PATENT DOCUMENTS

| | | |
|---|---|---|
| CN | 1964653 A | 5/2007 |
| CN | 105310462 A | 2/2016 |
| EP | 2950610 A1 | 12/2015 |
| TW | 200924684 A | 6/2009 |
| WO | 8304465 A1 | 12/1983 |
| WO | 9324040 A1 | 12/1993 |
| WO | 03073898 A1 | 9/2003 |
| WO | 2006000700 A2 | 1/2006 |
| WO | 2017066692 A1 | 4/2017 |

* cited by examiner

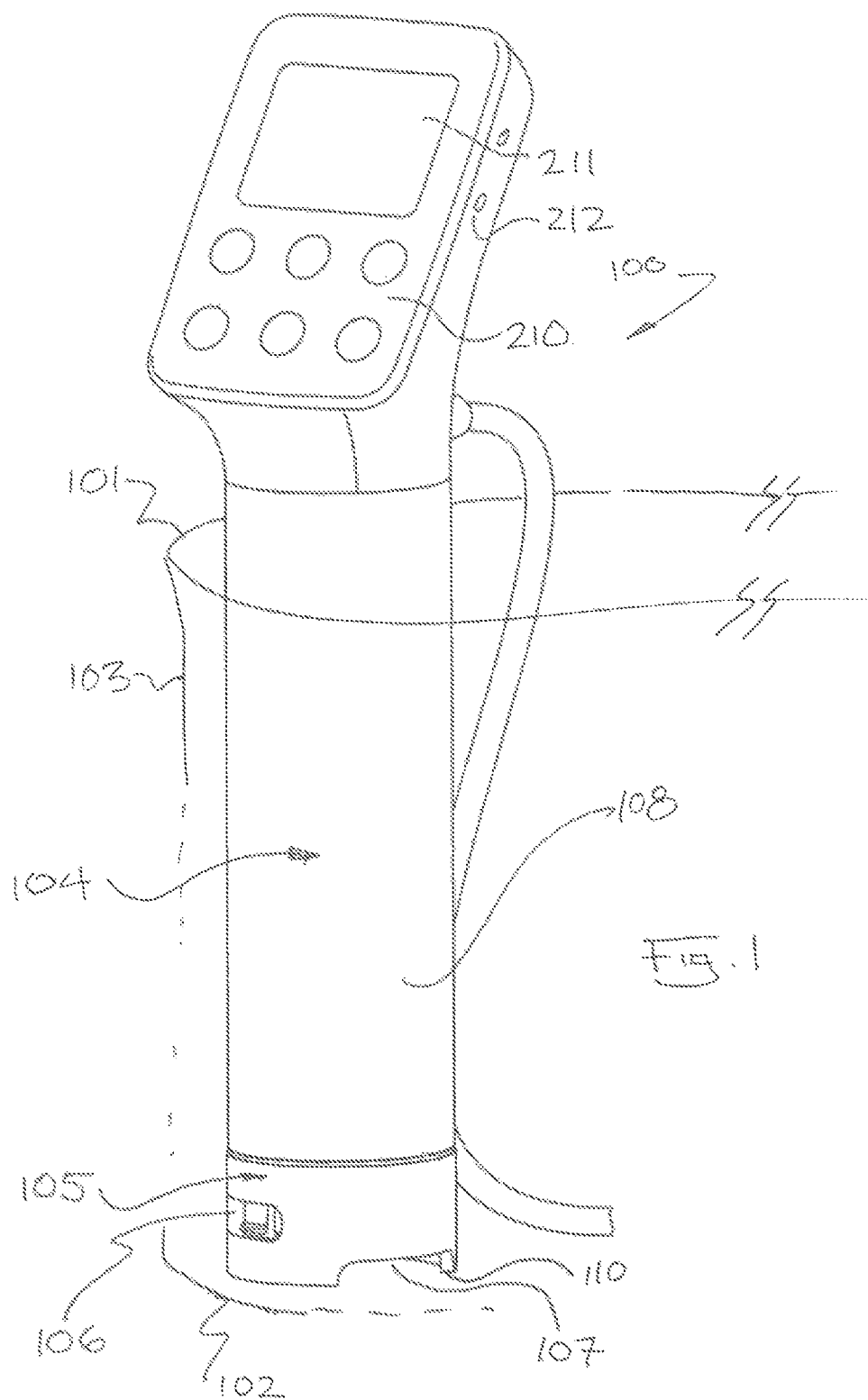

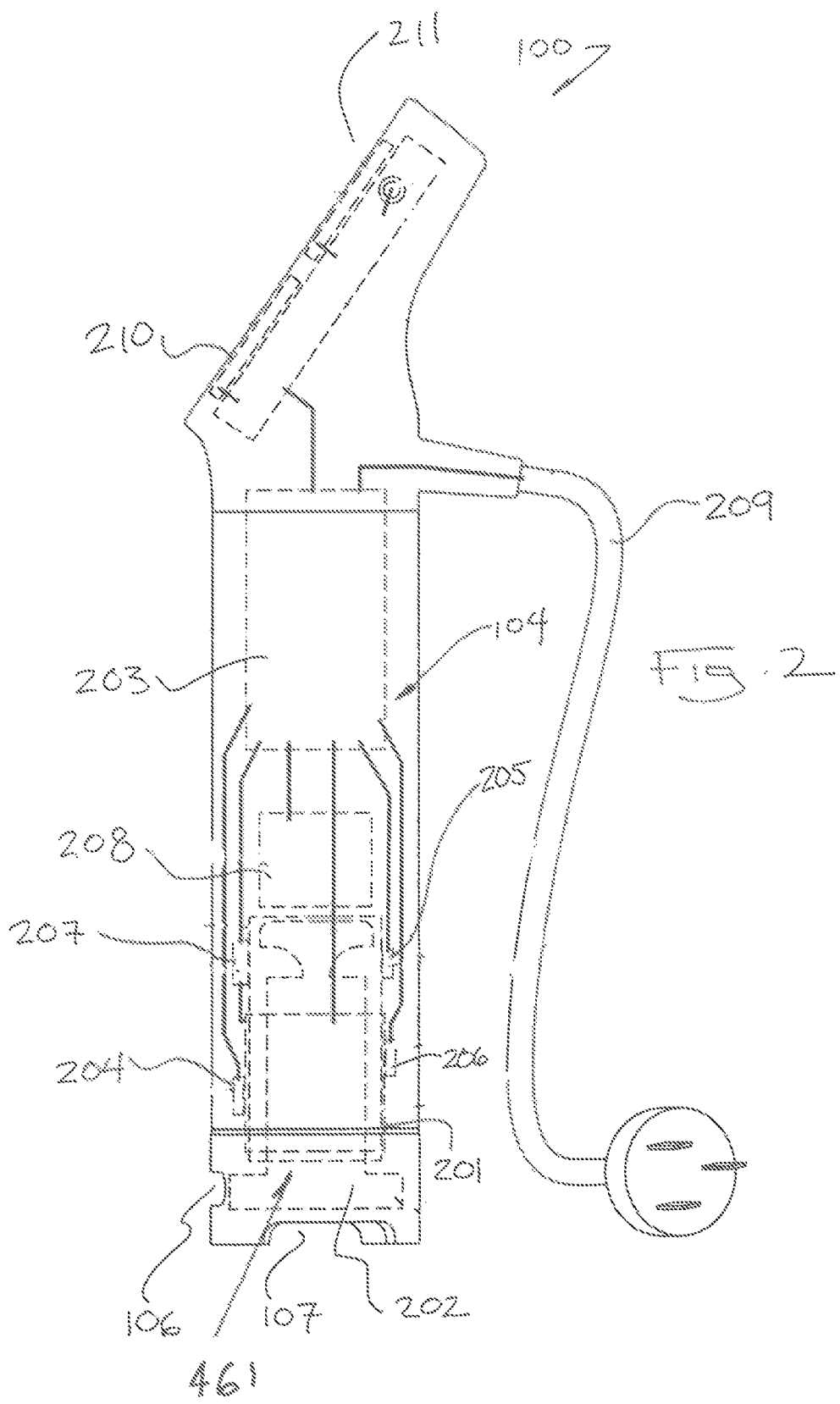

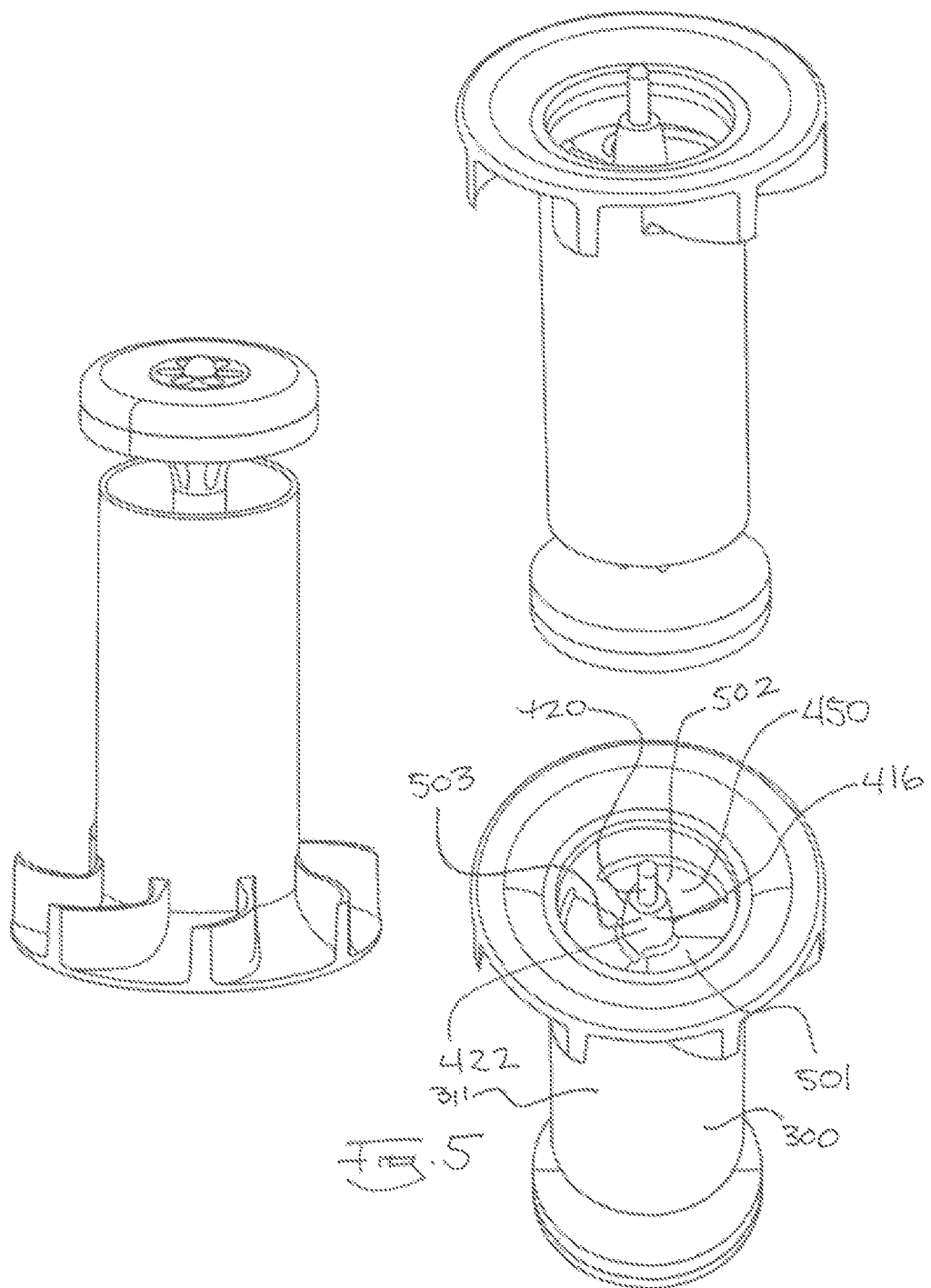

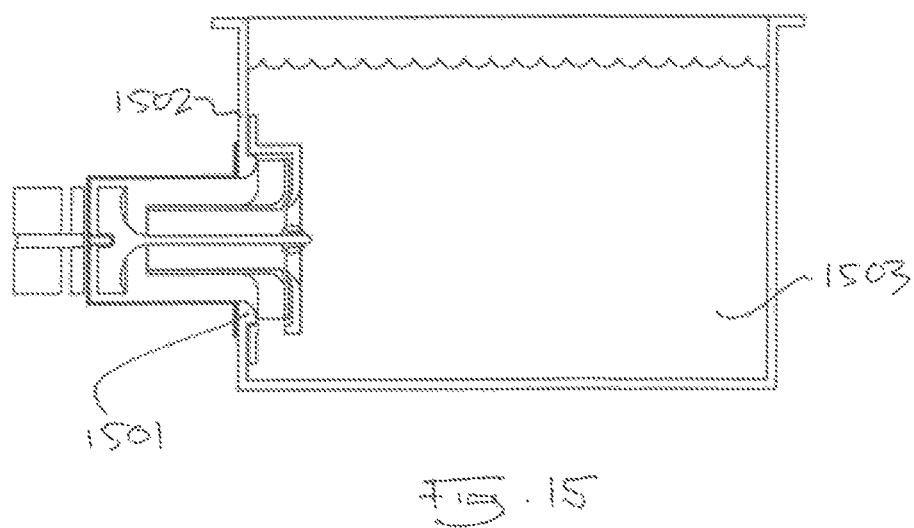
FIG. 15
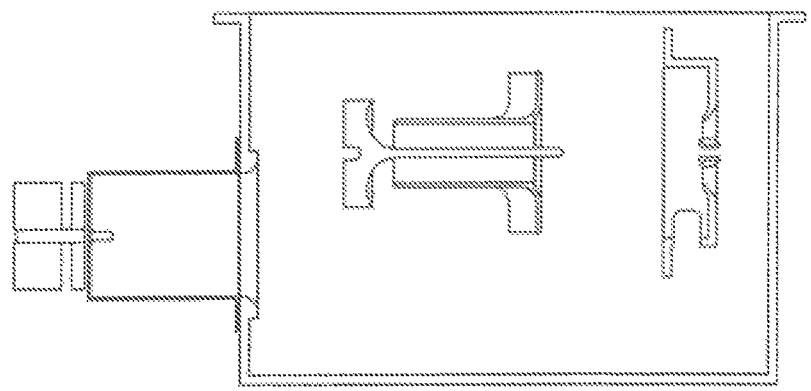

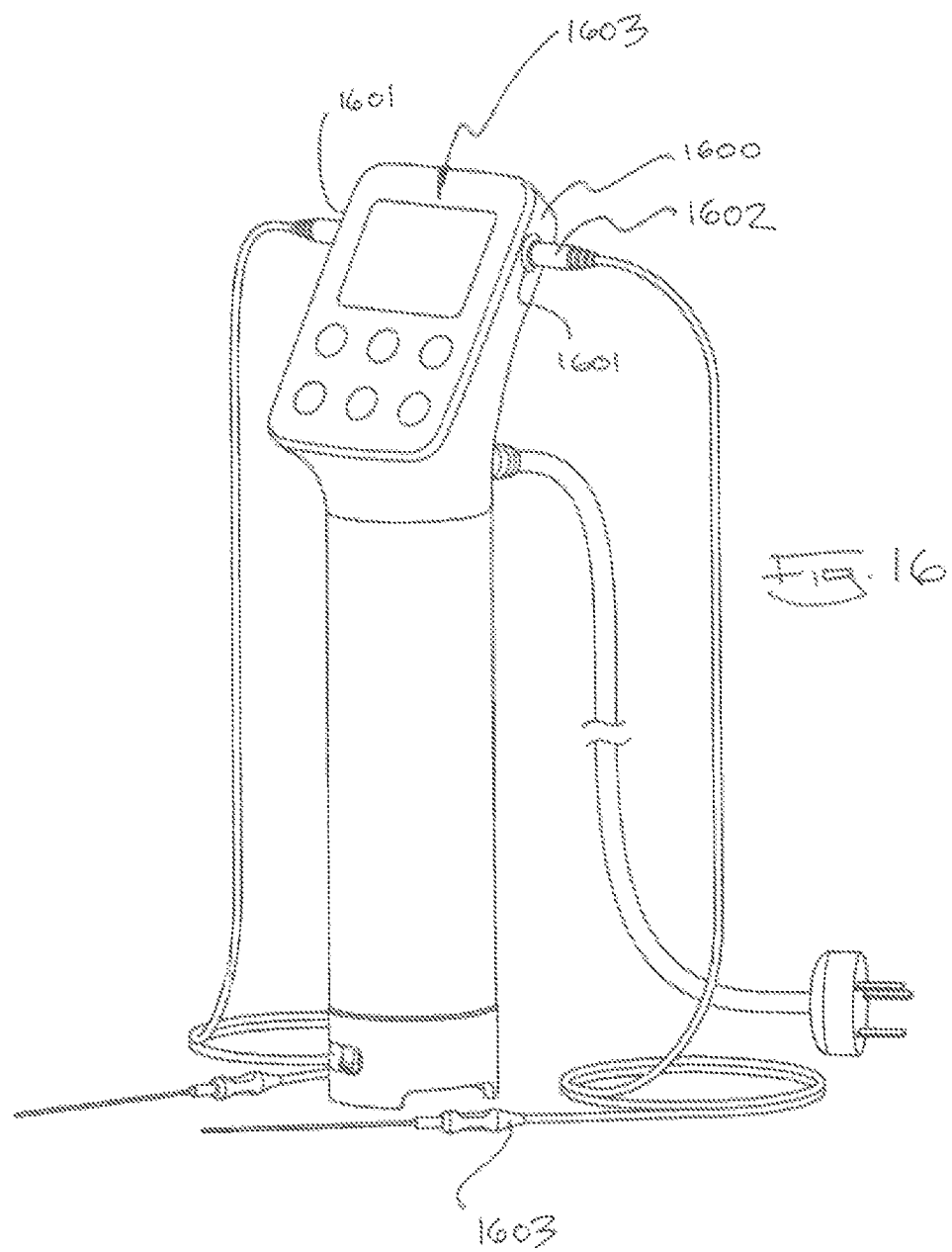

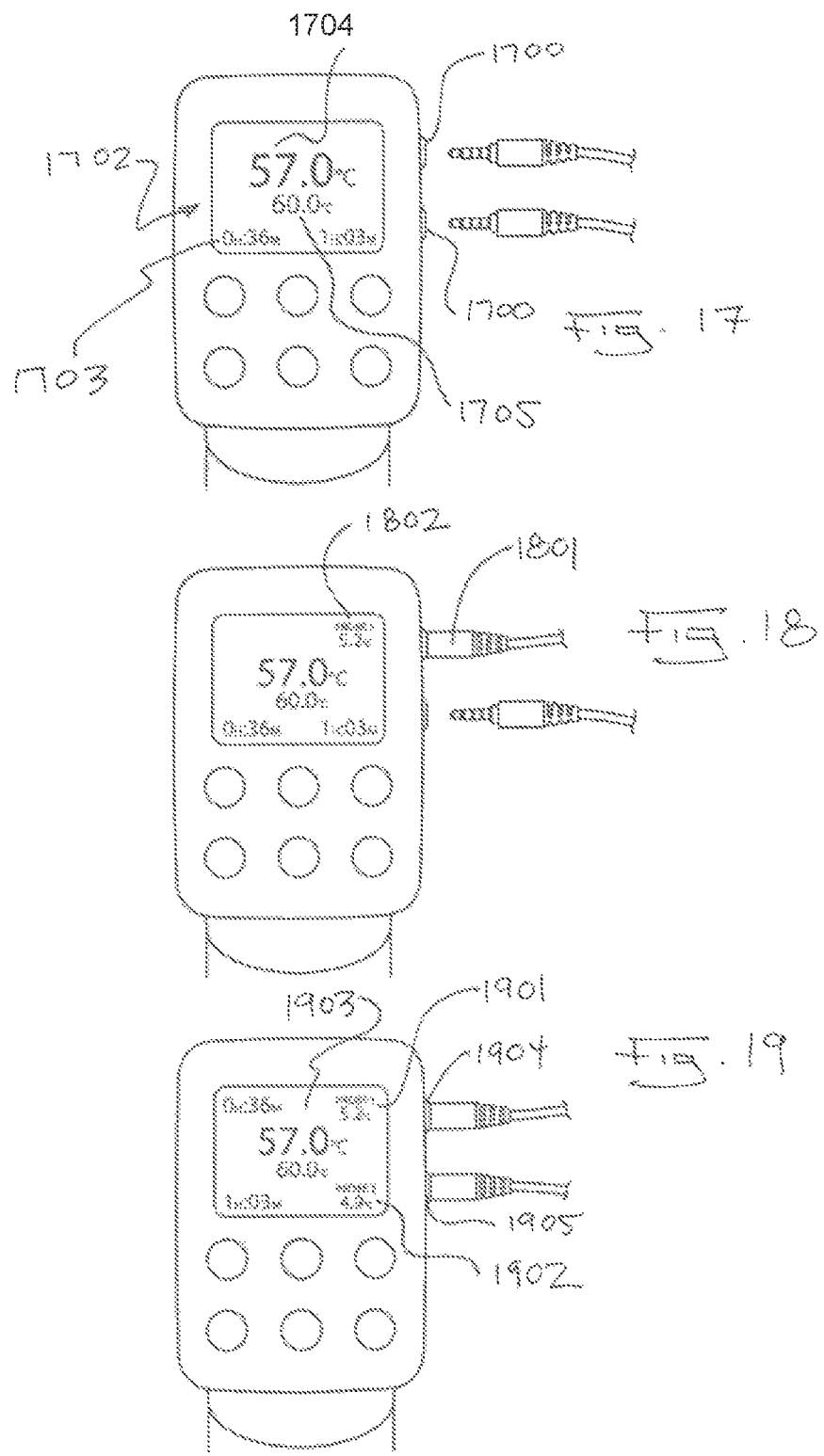

SOUS VIDE DEVICE

CROSS-REFERENCE TO RELATED APPLICATIONS

This application claims priority to and is a continuation of U.S. patent application Ser. No. 16/636,000, filed on Jan. 31, 2020, which is a national stage entry, filed under 35 U.S.C. § 371, of International Patent Application No. PCT/AU2018/000156, filed on Aug. 29, 2018, which claims the benefit of Australian Patent Application No. 2017903600, filed on Sep. 6, 2017. The contents of the aforementioned U.S. patent application, international patent application, and Australian patent application are incorporated herein by reference in their entireties.

FIELD

The invention relates to sous vide devices and more particularly to an immersion style sous vide device.

BACKGROUND OF THE INVENTION

Sous vide devices can be categorised as being either a bath type or an immersion type device. Bath type sous vide devices have a dedicated cooking vessel or reservoir that is integrated with a recirculating, heated water supply, timers and other features. The immersion type device seeks to provide comparable functionality in a compact form that can be immersed into an ordinary vessel. Because the device can be used with an ordinary pot, it solves storage problems associated with a vessel-sized solution, and also provides a cost advantage to vessel-based solutions. It is therefore favoured in kitchens.

The present technology seeks to improve the design and construction of both immersion and bath type sous vide devices. The technology provides performance benefits, ease and versatility of use, and facilities hygiene and maintenance.

SUMMARY OF THE INVENTION

There is disclosed herein a sous vide device including:
an outer housing;
a first inner wall located within the housing and enclosing a space;
a second inner wall located in the space and enclosing a first duct, with a second duct being located between the first inner wall and second inner wall, with the first duct having a liquid inlet, and the second duct having a liquid outlet adjacent the liquid inlet, with the first duct being connected to the second duct at a position spaced from the inlet and outlet so as to provide a liquid flow path extending from the inlet to the outlet;
rotatably driven vanes associated with the fluid flow path to cause liquid to flow from the inlet to the outlet;
a motor drivingly connected to the vanes to cause rotation thereof; and
a heater operatively associated with the fluid flow path to heat the liquid passing therealong.

Preferably, the heater is mounted on a surface facing the second duct to heat the liquid as liquid passes along the second duct.

Preferably, the second inner wall is mounted for rotation about a rotational axis, and is rotatably driven by the motor, with the vanes attached to the second inner wall so as to be rotatably driven thereby.

Preferably, the vanes are located adjacent the outlet so as to propel the liquid through the outlet from the second duct.

Preferably, the first inner wall is tubular, and the second inner wall is tubular.

Preferably, the sous vide device further includes a temperature sensor mounted on the first inner wall and to provide a signal indicative of the temperature of the liquid passing along the second duct.

Preferably, the sous vide device further includes a switch operatively associated with the heater to deliver electric power thereto, with the switch being mounted on the first inner wall so as to be at least partly cooled by liquid passing along the second duct.

Preferably, the motor is mounted to be remote from the inlet and outlet so as to be positioned adjacent where the first duct communicates with the second duct. Preferably, the vanes are vanes of an impeller.

Preferably, the sous vide device further includes a first magnetic coupling rotatably driven by the motor, and a second magnetic coupling driven by the first magnetic coupling and associated with the vanes so as to cause rotation thereof.

Preferably, the second duct is annular in configuration and surrounds the first duct.

There is further disclosed herein a sous vide device including:
an outer housing;
a drive wall rotatably mounted in the housing and enclosing a duct that is at least part of a liquid flow path through the device;
a plurality of vanes mounted on the wall so as to be rotatably driven thereby to cause the liquid to pass along the flow path;
a heater to heat the liquid passing along the flow path; and
a motor drivingly coupled to the tubular wall to rotate the tubular wall.

Preferably, the sous vide device further includes a first magnetic coupling rotatably driven by the motor, and a second magnetic coupling, rotatably driven by the first magnetic coupling, and fixed to the tubular wall so that rotation of the motor causes rotation of the tubular wall via the first and the second magnetic coupling.

Preferably, the vanes are vanes of an impeller.

Preferably, the drive wall is a first wall, the duct is a first duct and the sous vide device includes a second wall, with the second wall surrounding the first wall so as to provide a second duct located between the first wall and the second wall that is connected to the first duct so as the first and second ducts provide said fluid flow path.

Preferably, the heater is mounted on the second wall.

Preferably, the sous vide device further includes a switch operatively associated with the heater to deliver electric power thereto.

Preferably, the first duct provides a fluid flow path inlet, and the second duct provides a fluid flow path outlet, adjacent the inlet, with the first duct communicating with the second duct at a position remote from the inlet and outlet, and the vanes are located adjacent the outlet.

BRIEF DESCRIPTION OF THE DRAWINGS

In order that the invention be better understood, reference is now made to the following drawing figures in which:
FIG. 1 is a perspective view of an immersion type sous vide device.

FIG. 2 is a cross-sectional schematic view of the device depicted in FIG. 1;

FIG. 5 is a perspective view of a hybrid (or compound) impeller component;

FIG. 15 is a schematic cross-section illustrating the integration of the present technology with a dedicated reservoir;

FIG. 16 is a perspective view of a sous vide device having remote temperature probes;

FIG. 17 is a plan view of a user interface adapted to receive jacks from two different thermal probes;

FIG. 18 is a plan view of a user interface adapted to receive jacks from two different thermal probes;

FIG. 19 is a plan view of a user interface adapted to receive jacks from two different thermal probes;

BEST MODE AND OTHER EMBODIMENTS OF THE TECHNOLOGY

Figure 1A:
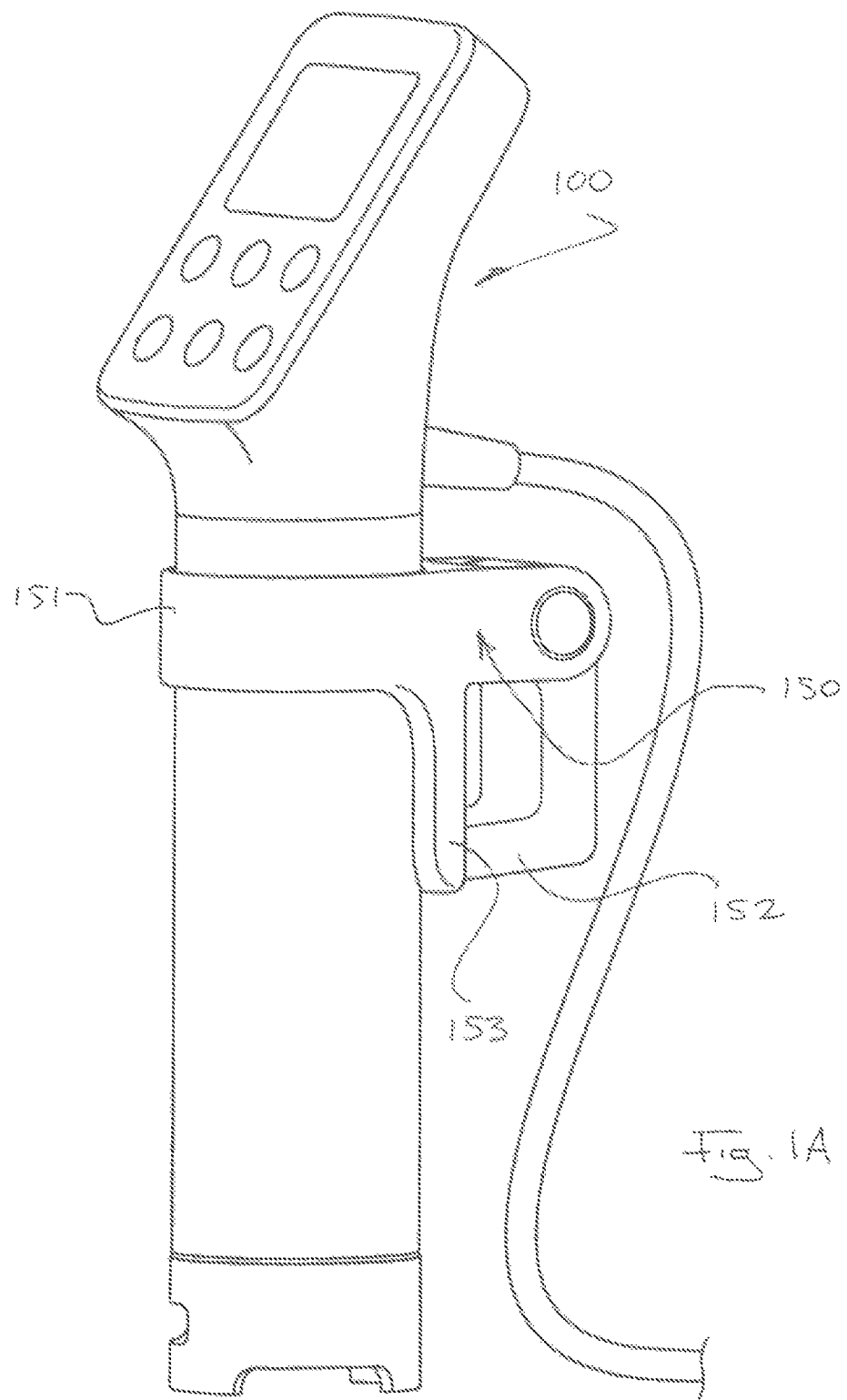
FIG. 1A is a perspective view of an immersion type sous vide device.

As shown in FIG. 1, FIG. 1A and FIG. 2, the present technology may be embodied in an immersion type sous vide device 100. A device such as this is immersed in a vessel 101. The device has a flat bottom surface 110 that can rest on the bottom of the vessel 102. In the alternative and as shown in FIG. 1A, a clamp 150 may be provided to attach the device to a pot. The clamp 150 has a collar 151 in which the device 100 can be raised or lowered relative to the collar 151. A screw tightened or spring loaded clip 152 bears against a lower part 153 of the collar 151. In the alternative it can be attached to a side wall of the pot 103. The device 100 has a cylindrical body (outer housing) 104. The body 104 has a cylindrical and removable foot 105 that functions in this example as both an intake port and an output port. When the device is operating, water is drawn into an axial intake port 107 and is discharged through at least one radially directed output port 106. As will be explained, the cylindrical main body portion 108 surrounds a cylindrical output flow path that is adjacent a cylindrical heating element and outwardly concentric an intake flow path within it. The flow paths may be reversed in some embodiments by changing the directionality of the impellers.

As shown in FIG. 2, the tubular heater 201 and a motor driven impeller 202 are controlled by a power control module 203. By way of example, a multi-phase brushless DC motor and control circuit may be used. The power control module 203 also receives inputs from the heater's over-temperature fuse or sensor 204, a first temperature sensor 205 that senses the temperature of an incoming water flow and transmits relevant information to the power control module 203, and a second temperature sensor 206 that measures the temperature of the heating element (for example a cylindrical thick film heater) and transmits this information to the processor 203. The power control module 203 regulates a triac 207 that is preferably mounted to better dissipate heat by thermally conducting through a surface and or body with circulating water. The power control module 203 regulates the heating element by controlling the firing of the triac 207. The power control module 203 also regulates the operation of the motor 208 providing the benefit of being able to control the flow rate of water for varied applications. Larger volume vessels can require higher flow rates to satisfactorily mix larger volumes of water, whereas smaller volume or shallowly filled vessels require can benefit from lower flow rates to prevent surface agitation or 'bundling' of bagged items. The motor 208 drives the impeller 202.

The power control module 203 receives input commands from a user interface 210. Conventional user input commands relate to time and temperature profiles, limits or other preferences. The power control module 203 provides information to the user interface through a graphic display 211. The device has one or more temperature probe input ports 212. Temperature information from a remote probe may be displayed on the graphic interface 211.

Figure 3:
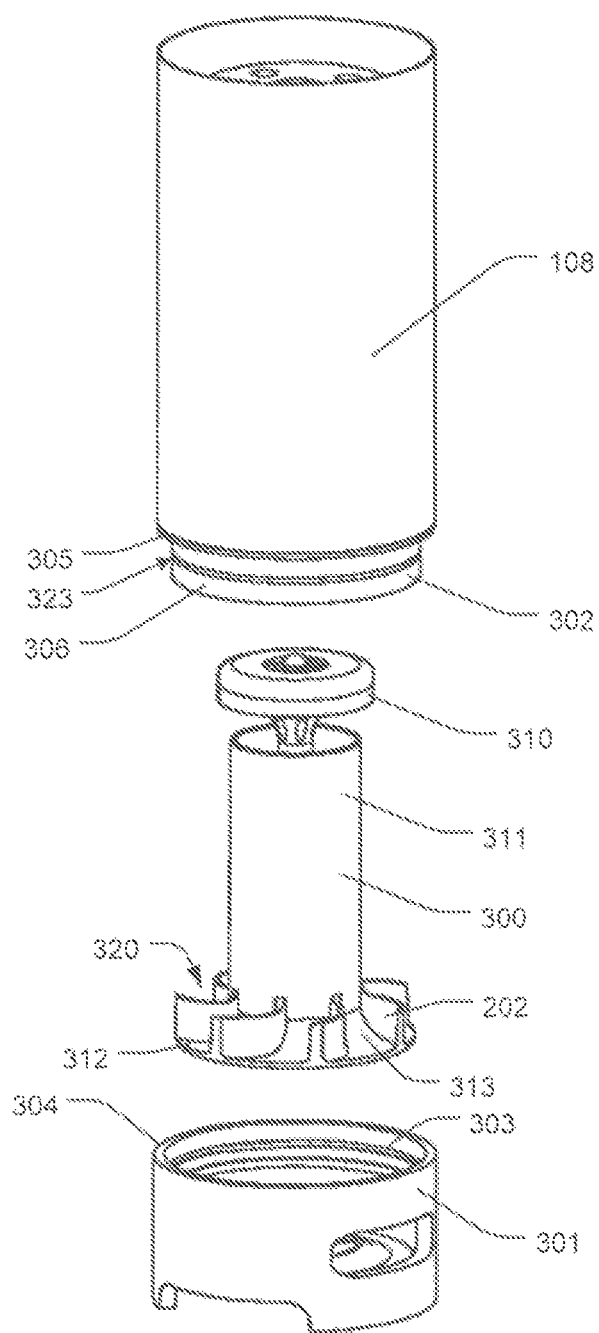
FIG. 3 is an exploded perspective view of a main body, foot and impeller component.

FIG. 3 illustrates the main body tube 108 in relation a magnetically driven impeller 300 assembly and the generally cylindrical foot 301. In preferred embodiments, the foot 301 and main body 108 removably and rotatably connected to one another and capture between them, the freely rotating impeller 300. In this example, a neck or coupling area 302 has an external surface 306 that cooperates with a metallic spring type ring 303 internal to the foot 301. When assembled, the foot's exterior 301 is flush with the exterior of the main body 108 and its axial location with reference to the main body is established by contact of the upper rim 304 of the foot 301 with a shoulder 305 adjacent to the neck or coupling area 302. The neck or coupling area 302 may be adapted to couple of engage the foot 301. In this example, the coupling area 302 defines a groove 323 that aligns with the spring type ring 303 when the main body 108 is coupled to the foot. The spring can be retained by a groove in both the neck and the foot for enabling the body to rotate with respect to the foot while coupled. It will be appreciated that the engagement or coupling may alternatively use threads (e.g. at 306) or other means. The foot 301 is adapted to rotate and thereby provide user adjustability of the flow direction of the discharge water path. This is advantageous to optimise circulation and temperature stability to avoid disparate temperature regions within the bath when multiple bagged items are placed within.

As shown in FIG. 3, the impeller assembly 300 has a head 310 defined by the lower half of the magnetic coupling to the motor, a cylindrical, axial partition 311 an array of radial vanes 202 forming a discharge impeller 320 formed around the lower exterior of the inner tubular wall (inner wall-partition) 311 that encloses a first duct 461. The base of each vane 202 is integrated with the upper surface 313 of the region of the impeller assembly whose lower surface forms a smoothly curved central intake port 312. Thus, the same web of material forms the exterior surface of the intake and the inner surface of the discharge area between the individual vanes 202 and the in-current and ex-current flows are produced coaxially, minimizing the required water draft for operation.

Figure 4:
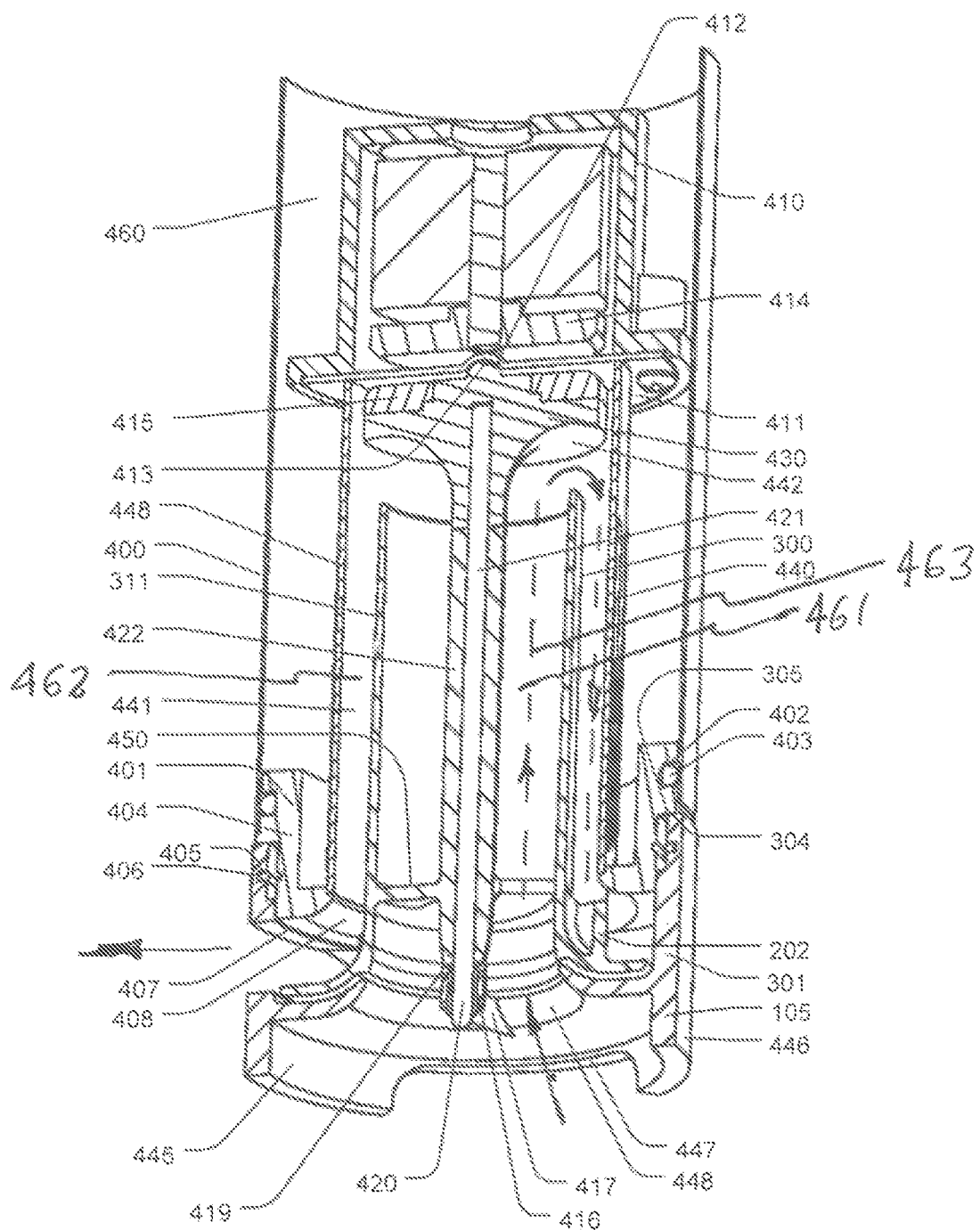
FIG. 4 is a cross-sectional view through a main body, impeller and foot.

As shown in FIG. 4, the outer tube 400 of the main body 108 contains a dry compartment 460 defined by a terminal ring 401 and having a heater tube (further inner wall) 448. The ring 401 fits within the lower end of the outer tube 400 and is sealed against it. The ring has a groove 402 that carries a polymeric seal 403, such as an O-ring type seal. The ring maybe attached to the tube in other ways. The ring forms a neck or a coupling surface 404 that is adapted to fit within the foot 105. In this example, the foot forms the female portion of a coupling or engagement with the main body 108 and carries a polymeric seal or a circular spring wire 405 in a circumferential groove 406 for this purpose. Other means of attachment are contemplated. A second duct 462 is located between the inner tubular wall 311 and heater tube 448.

The ducts 461 and 462 co-operate to provide a flow path 463 extending from the inlet port 107 to the outlet port 106. The duct 461 is cylindrical in configuration which the duct 462 is annular and surrounds the first duct 461. The direction of flow in the duct 461 is opposite the direction of flow in duct 462.

The ring 401 preferably makes flush contact 407 with the upper surface of the foot's intake port 407. The ring 401 thus forms a smooth or tapered throat 408 that receives the impeller assembly and related parts 300.

The impeller component 300 is isolated from the electric motor 410 by a sealed barrier or plate 411. In this example, the plate has a dimple 412, the underside of which receives an upper most bearing surface protrusion 413 of the impeller 300. The motor 410 drives one half 414 of a magnetic coupling. An upper portion 415 of the impeller component 300 carries internal magnets and forms the other half of the magnetic coupling arrangement. Thus, no direct contact is made between the motor and the impeller assembly and the motor remains fluidically isolated or environmentally sealed from the impeller 300 and the flow path of the water around it. The ducts 461 and 462 communicate adjacent the motor 410.

In one direction, the axial motion of the impeller assembly 300 is restrained by the contact between the bearing surface 413 and the dimple 412. In the other direction, the motion is restrained by a hub 416 carried by one or more arms 417 that extends inward from underside 418 of the foot 105. The hub 416 may have a bearing or bushing 419 for carrying a tip 420 of the impeller component 300. In preferred embodiments, the outer diameter of the hub 419 is the same as the diameter of the tapered distal tip of the shaft 422. The tip 420 maybe provided as the terminal end of a longitudinal metal shaft 421 carried along and within all or a part of the longitudinal extent of the impeller shaft 422. The impeller shaft 422 interconnects the impeller's head 430 with the array of vanes 202. The impeller device 300 also has a cylindrical partition 311. Water drawn into the device travels upwards through the centre of the partition and then reverses direction and flows downward, contacting the cylindrical heated surfaces of the tubular heater and scavenging the heat applied.

The cylindrical heater tube 448 interconnects the sealing plate 411 and the ring 401. In this example, the heater tube 448 carries a heater such as a thick film heating element. The lower end of the heater tube 448 is attached to the inner diameter of the ring 401. The heater tube is empty, but for the impeller.

Cooler water from the vessel is picked-up by the innermost chamber of the hybrid impeller which is defined about the impeller's shaft 422 and within an inner surface of the cylindrical partition 311. At the upper terminus of the impeller, there is optionally a flow diverter shape formed on the underside of the lower magnetic coupling body 442. This flow diverter advantageously changes the collective vector of the incoming water from upward to downward, permitting the water to scavenge heat that is generated by the heated tube 448. The now heated water flowing downward outside the tubular partition 311 changes its collective vector from axial to radial direction by action of the multiple rotating vanes (202). The flow paths may be reversed in some embodiments by changing the directionality of rotation and vanes.

The radially displaced discharge flow is carried between the wall of the tubular heater or heated tube 448 and the outer surface of the partition 311. The partition tube 311 and the impeller shaft 422 are attached by legs which are in one embodiment comprised of the plurality of axial impeller vanes 450.

The underside of the foot is formed by the flared or tapered, intake throat area 418, blending smoothly into a diameter that is defined by the inside surfaces 445 of the projections 446 that elevate the intake port from the bottom surface of a pot should it be resting on one. Elevated scallops 447 in the bottom edge of the foot allow the cooler water from the bottom of the vessel to be entrained into the upward flow created by the central axial impeller 450 even when the device is resting flat against the bottom of a pot.

Figure 4A:
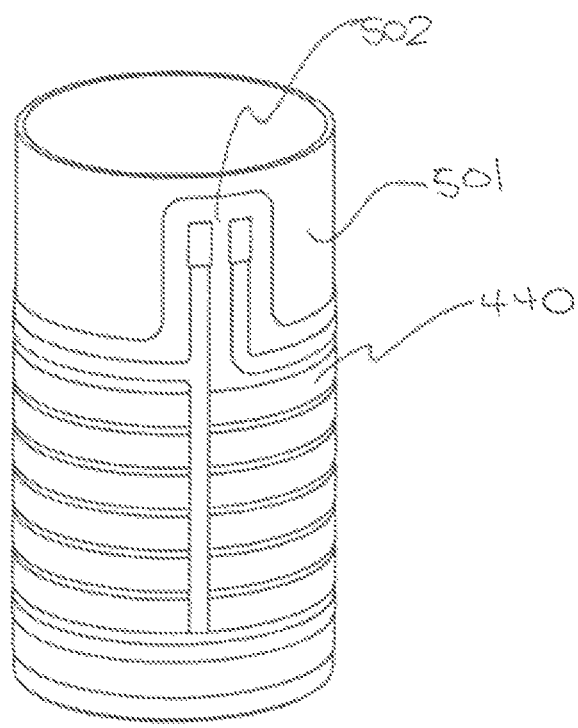
FIG. 4A is a perspective view of a heater tube comprising a thick film heater circuit on the dry or external surface of the tube.

As shown in the example FIG. 4A, the thick film heating element 440 is formed directly on to or applied to a cylindrical heater tube 501. Contact points 502 for the heating elements circuit are contained within the dry compartment adjacent and concentric to the outer tube. It will be evident to one skilled in the art that other types of heaters may be used to heat the cylindrical heater tube 501.

As shown in FIG. 5, the impeller component 300 may have a second set of impeller vanes 450 that interconnect the hub 416 with the cylindrical partition 311. In this example three (3) fan or propeller-like blades 502 assist in pumping liquid into the partition 311 when the impeller is rotated. Three propeller vanes are depicted however other numbers of propeller vanes can be substituted. The vanes 502 are formed around the impeller shaft adjacent to the bearing or tip 420. The portion of the shaft 422 between the vanes 502 and the tip 420 is preferably tapered 503.

Figure 6:
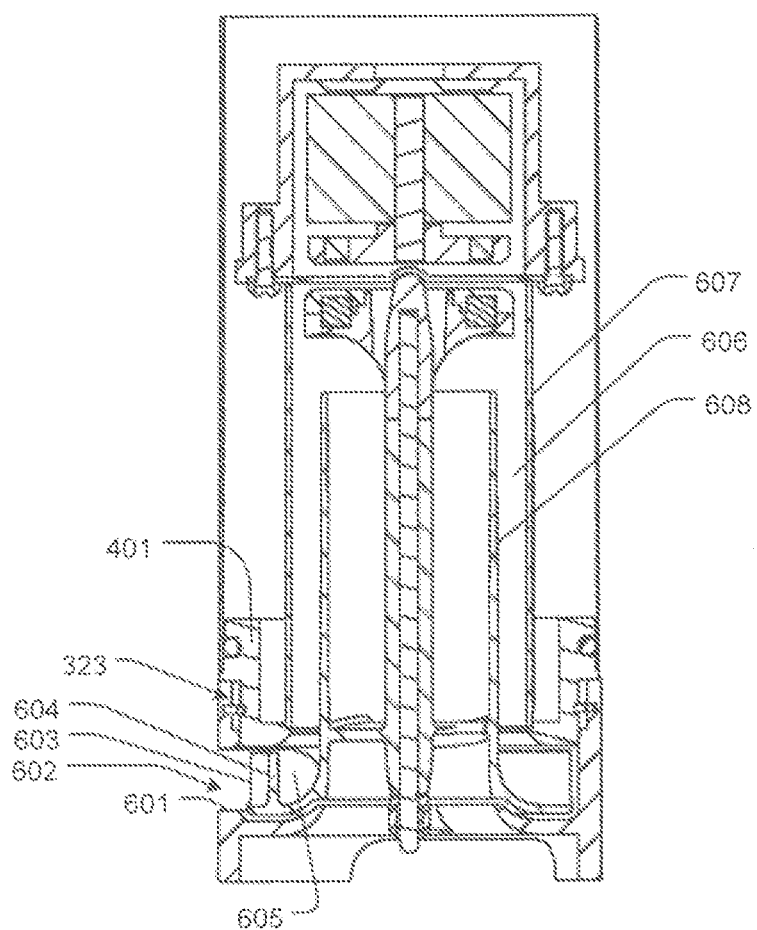
FIG. 6 is a cross-sectional view of an immersion type sous vide device.

As shown in FIG. 6, the discharge port 601 is in the form of one or more circumferentially elongated openings, in one embodiment having rounded ends. The port 602 is adjacent to the tips 603 of the discharge vanes 604 in the impeller component 300.

Figure 7:
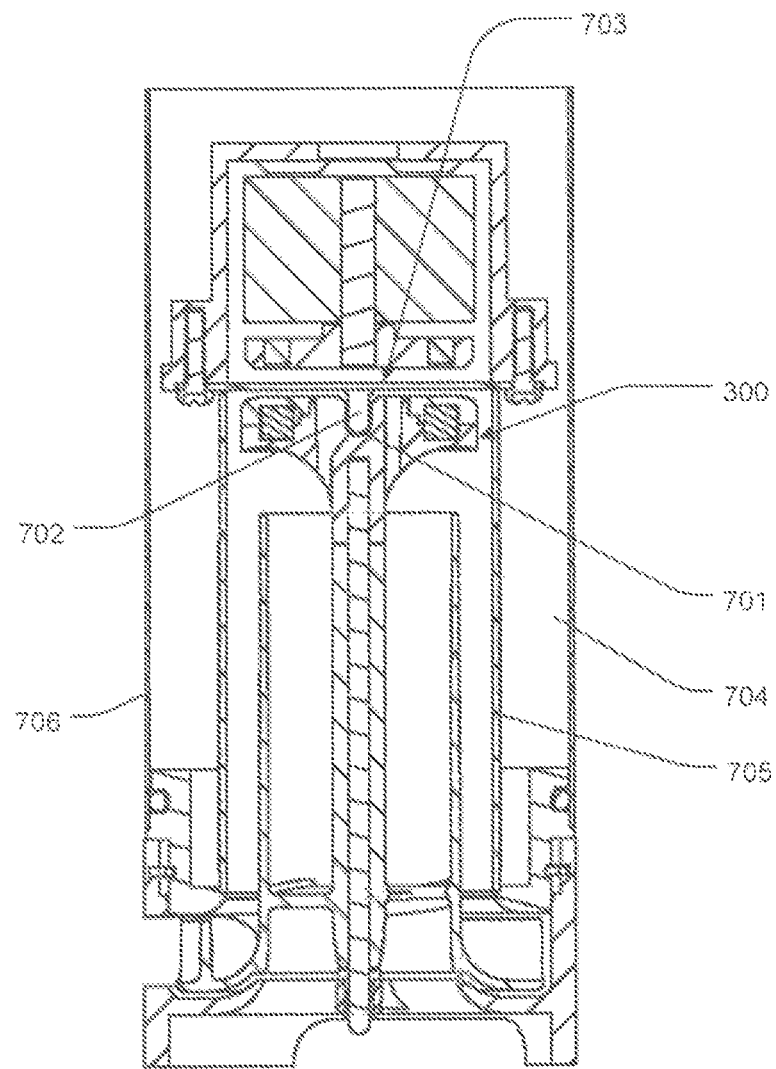
FIG. 7 is a cross-sectional view of an immersion type sous vide device.

In the example of FIG. 7, the upper surface of the impeller component 300 forms a recess 701. In one embodiment the recess is formed into an engineering polymer or other material adapted to receive a locating pin or stub shaft 702. The shaft 702 is preferably formed on to or attached to a sealed plate or component 703 that defines the dry compartment 704 between the heater tube 705 and the main body's outer tube 706.

Figure 8:
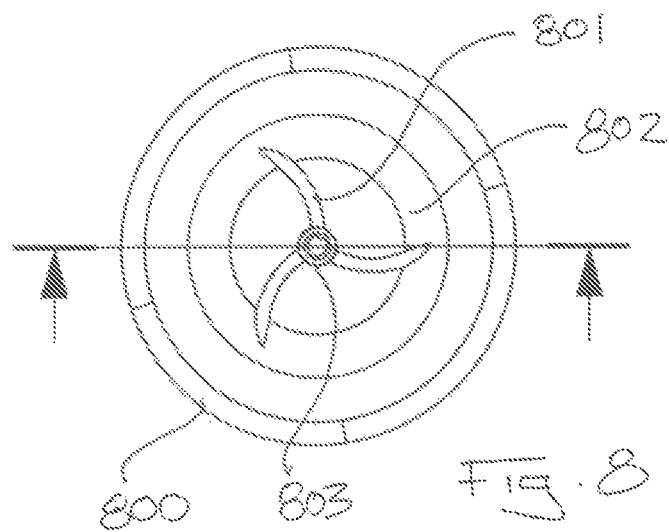
FIG. 8 is a bottom plan view of a foot.

As shown in FIG. 8, in one embodiment the circular foot 800 has integral and curved supporting legs 801 that extend from the intake throat area 802 to the central hub 803. The legs 801 are static with respect to the flow and are therefore preferably shaped and tapered to minimise hydrodynamic drag.

Figure 9:
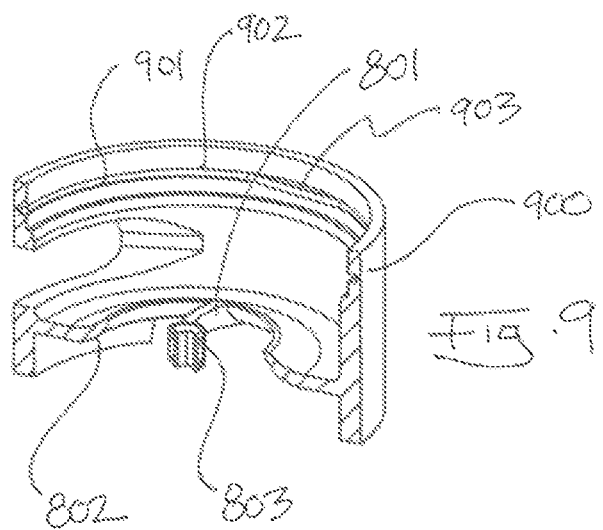
FIG. 9 is a cross-sectional view through the foot depicted in FIG. 8.

As shown in FIG. 9, the coupling between the main body and the foot 900 maybe achieved by way of a circular spring wire 901 carried by a groove 902 formed on an interior surface of the foot. The wire 901 has a flat spot 903 or other feature that either creates friction or engages a cooperating groove formed on the neck 302 of the main body 108.

Figure 10:
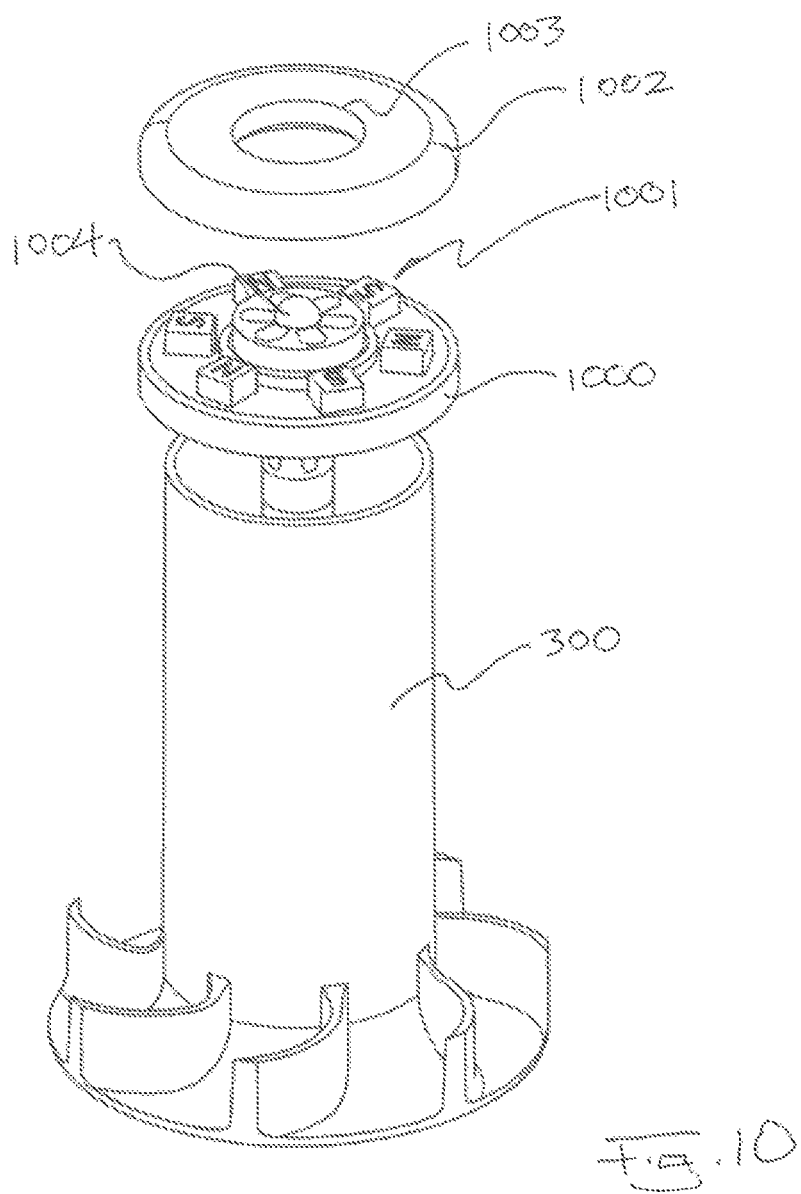
FIG. 10 is an exploded perspective of an impeller component showing magnets located within the head.

As shown in FIG. 10, the impeller component 300 has a head 1000 within which is located a circular array of magnets 1001. In this example, the magnets are arranged to alternate between north and south poles facing upward. The cooperating array of magnets associated with the device's motor is similarly arranged so as to optimise the centering and magnetic coupling relationship between the two coupling halves. The magnets may be moulded into the head, placed into the head and sealed with an epoxy or other sealing means, or retained below a separate and sealed cap 1002. The cap has a central opening 1003 so that the upper bearing 1004 is not interfered with but so that the separator plate or bulkhead 411 is continuously washed by incoming water permitting the incoming water temperature to be accurately thermally monitored.

Figure 11:
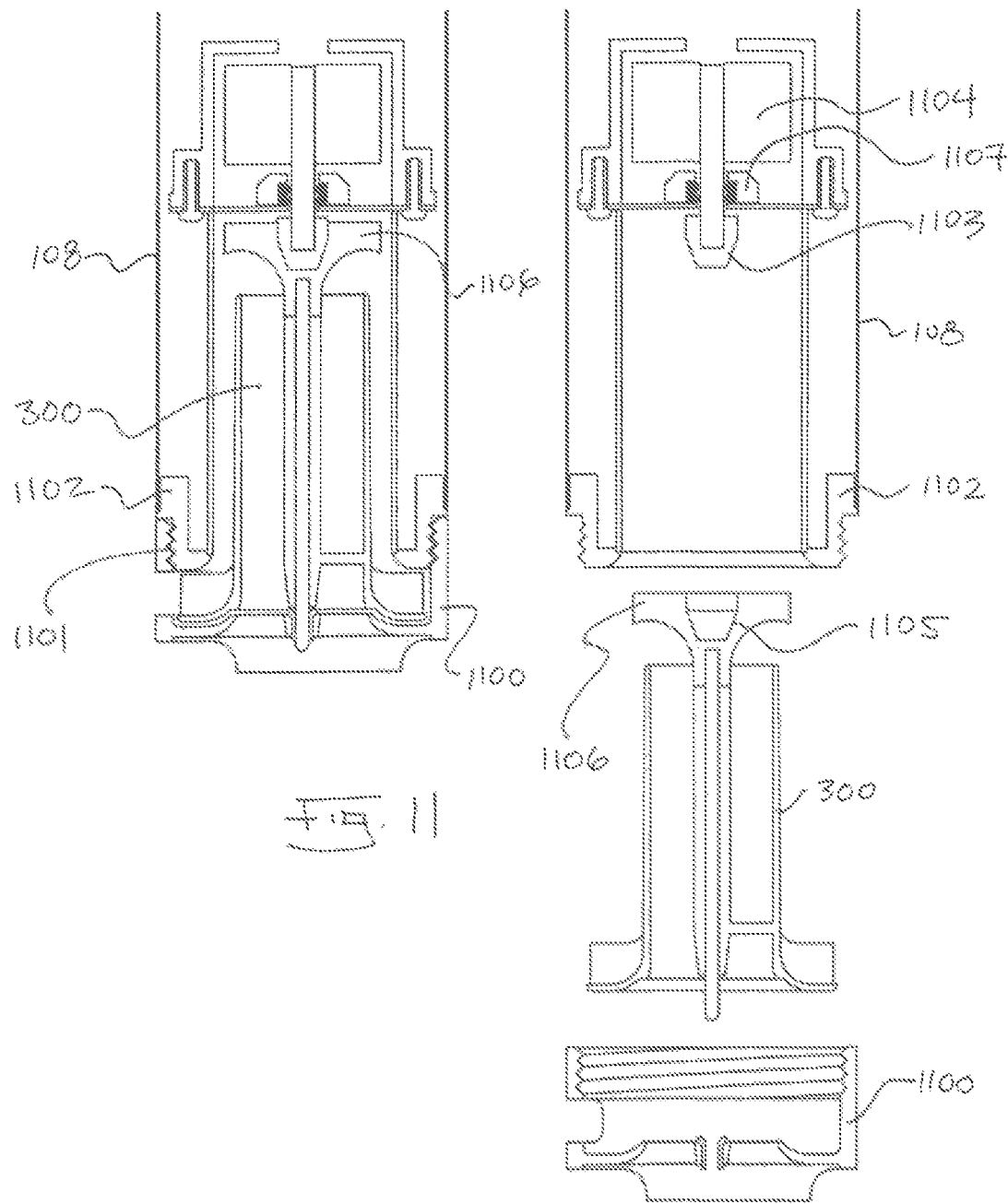
FIG. 11 is a schematic cross-section of an immersion type sous vide device having a removable impeller where the (complex or hybrid) impeller is driven via mechanical coupling to motor through a conventional shaft seal.

As shown in FIG. 11, the impeller component 300 is easily removed by disconnecting the foot 1100 from the main body 108. In this example, cooperating threads 1101 are formed on the sealing ring 1102 and the foot 1100. In this example, the impeller component 300 is driven by a first coupling component 1103 that is attached to the shaft of the motor 1104. The other half of the coupling arrangement 1105 is formed as a recess in the impeller components head 1106. In this embodiment a circumferential seal 1107 around the motor's shaft fluidically isolates the motor from the flow of fluid around the impeller.

Figure 12:
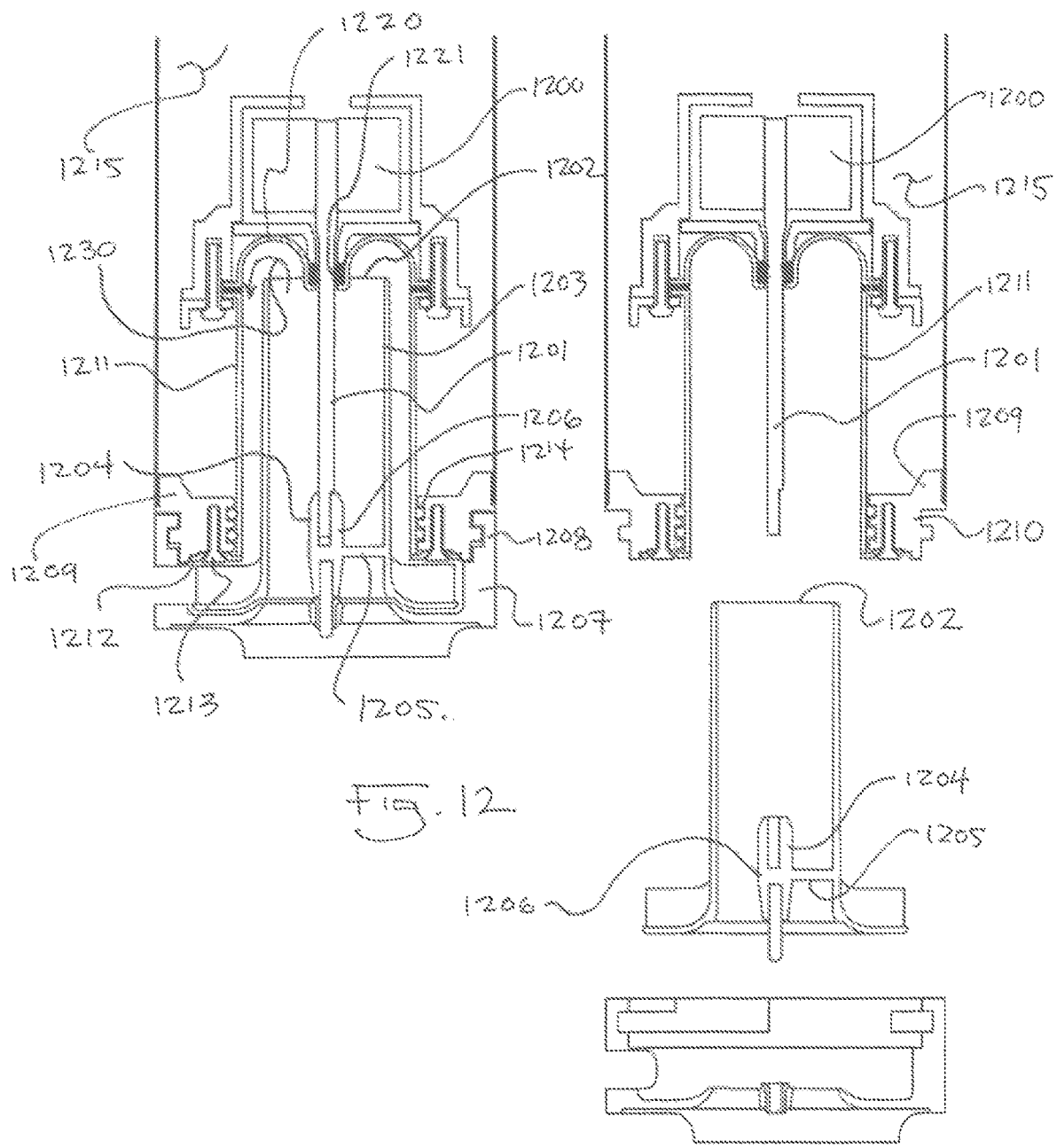
FIG. 12 is a schematic cross-section of an immersion type sous vide device having a removable impeller, where the (complex or hybrid) impeller is driven via mechanical coupling to motor through a conventional shaft seal.

As shown in FIG. 12, one embodiment of the device's motor 1200 may have an elongated, flatted or otherwise coupling-enhanced shaft 1201 to permit positive rotation of the impeller. In this example, the shaft extends from approximately the upper edge 1202 of the partition tube 1203 to a separable female coupling 1204 located just above the legs or vanes 1205 that connect the partition 1203 to the hub 1206. In preferred embodiments, the legs or vanes 1205 are located at a lower portion of the partition tube 1203. In this example, the foot 1207 carries a first part 1208 of bayonet coupling and that ring 1209 carries a second part 1210 of a bayonet coupling by which the foot and that main body are interconnected. In this example, the heater tube 1211 has a circumferential flange 1212 around the lower end. The flange is affixed to the ring 1209 within an array of axial fasteners 1213. In this example two (2) circumferential polymeric seals 1214 prevent the ingress of liquid into the dry compartment 1215. In the example of FIG. 12, the impeller lacks a head. Optionally, a flow diverter 1220 is fastened to an upper end of the heater tube 1211. The flow diverter preferably has a half-toroid shape. It is appreciated the flow diverter may comprise a different shape and be integral with the upper end of the heater tube 1211. The central part of the diverter carries a circumferential seal 1221 through which passes the elongated shaft 1201. The diverter assists with a low friction change of direction, folding or vector reversal of the flow 1230 as the flow is directed from an upward motion inside the partition tube to a downward motion between the partition tube 1203 and the heater tube 1211.

Figure 13:
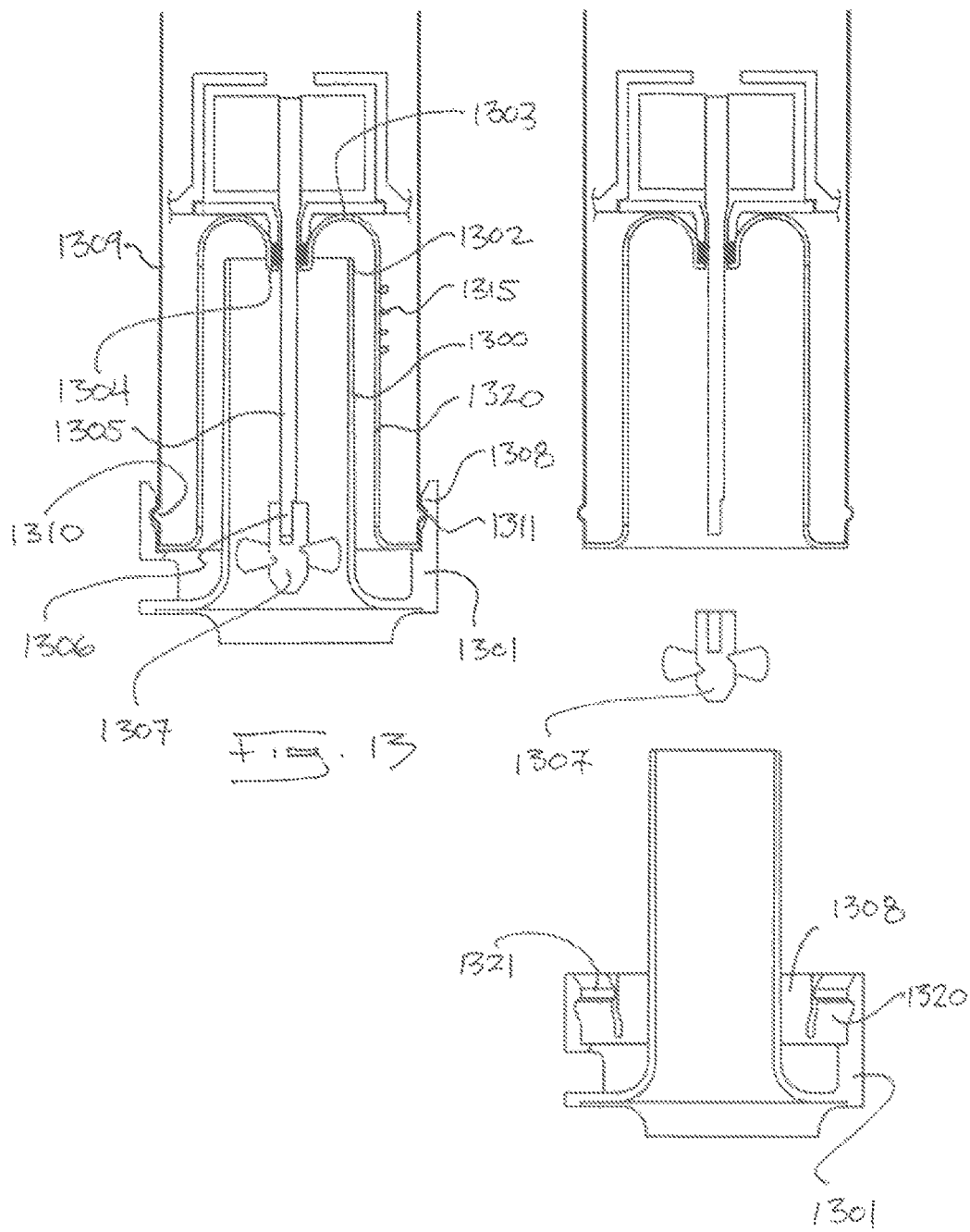
FIG. 13 is a cross-sectional illustration of an immersion type sous vide device having a motor with an elongated shaft and a static partition, where a single axial impeller is driven via mechanical coupling to motor through a conventional shaft seal.

In the example of FIG. 13, the partition tube 1300 is static. It is attached to the foot 1301. The upper end 1302 of the partition tube sits adjacent to or within a half-toroidal flow diverter 1303, the centre of which carries one or more seals 1304 for isolating the motor from the fluid flow. The motor's elongated shaft 1305 terminates in a coupling section 1306 that removably carries an impeller 1307. The foot 1301 has a flexible upper rim 1308 that receives the lower end of the main body 1309. The lower end of the main body 1309 has one or more individual or circumferential protrusions 1310 that sit within one or more pockets or a circumferential groove 1311 formed around the inside surface of the rim 1308. In some embodiments, the rim 1308 comprises one or more flexible arms 1320, each having a protruding lip 1321. The arms flex to engage and disengage a continuous protrusion 1310 around the lower end of the main body 1309.

Although previous examples have disclosed the utilisation of a cylindrical thin film heater to create an elongated and heated flow path, heat may be applied to the heater tube using conventional heating elements 1315 that are wound about or otherwise applied to an exterior of the heater tube 1330 or even function as a heated replacement for the separator tube.

Figure 14:
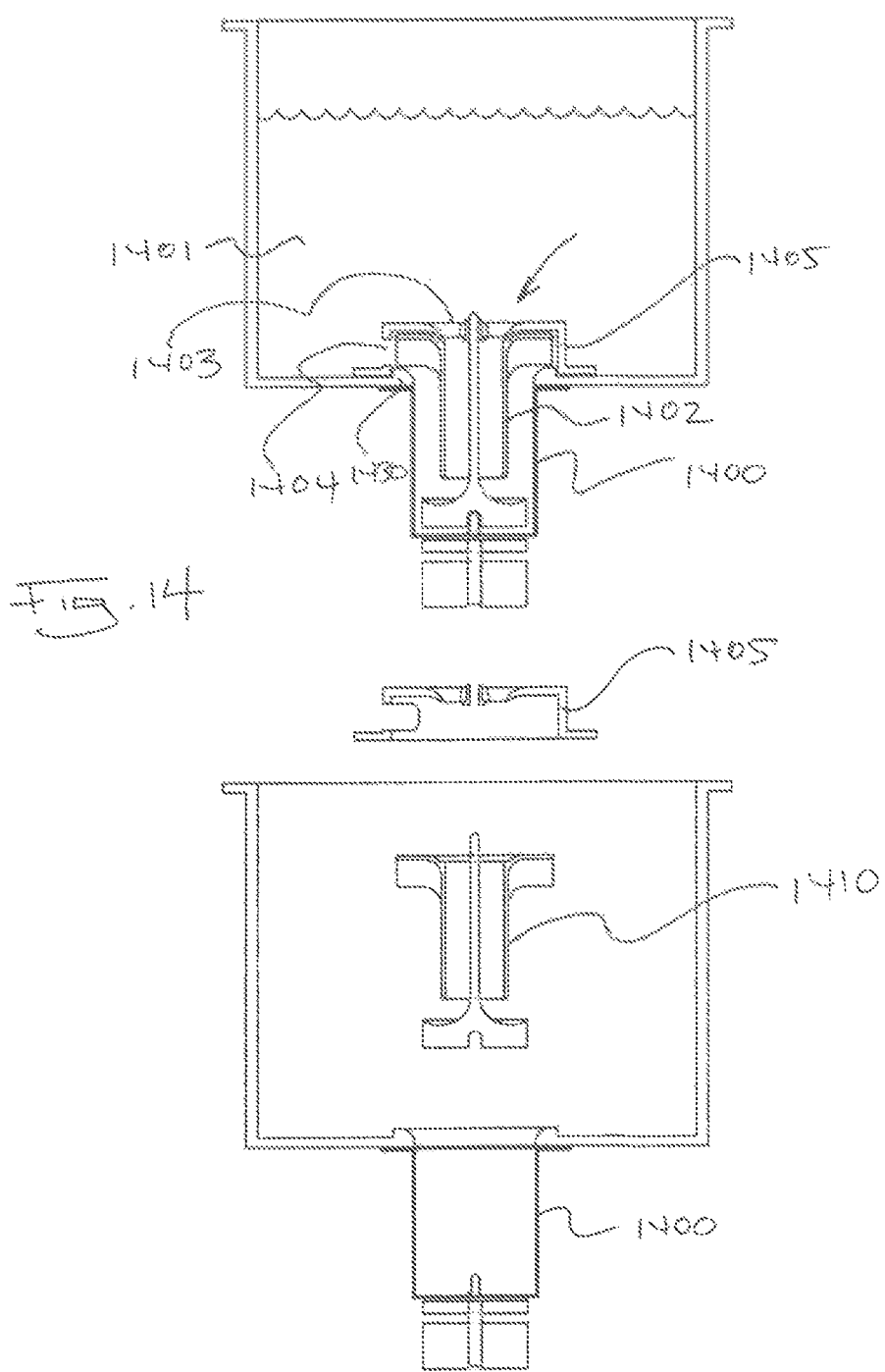
FIG. 14 is a schematic cross-section illustrating the integration of the present technology with a dedicated reservoir.

As shown in FIG. 14, a device fabricated in accordance with the previous disclosure for stand-alone use 1400 may be integrated with or attached to a dedicated reservoir 1401. Liquid in the reservoir flows into the partition tube 1402 through the intake 1403. The flow is discharged through the discharge port 1404. As suggested by FIG. 14, the main body 1400 is rigidly attached to or affixed to the reservoir while the foot 1405 is removable in the ways previously described. This allows the impeller component 1410 to be easily removed for cleaning or replacement. In the example of FIG. 14, the device extends through an opening 1430 in a bottom surface of the reservoir. In the example of FIG. 15, the device is retained within an opening 1501 in a sidewall 1502 of the reservoir 1503.

As shown in FIG. 16, the head of the device 1600 may have one, two or more receptacles 1601 for receiving the plug or plugs 1602 associated with a thermal probe 1603. In the example of FIG. 16, the receptacles 1601 are located on opposite lateral sides of the user interface 1603.

As shown in FIG. 17, the receptacles 1700 may be located on the same side of the user interface 1702. In this example, the interface displays cooking time information 1703, a measured temperature or average of same 1704 and a target temperature 1705.

As shown in FIG. 18, when only one of two thermal probes 1801 is attached to the head, a temperature display for that probe is created in an area 1802 of the graphic interface adjacent to the subject probe 1801.

As shown in FIG. 19, when both probes are inserted into their respective receptacles, two different temperature displays are created 1901, 1902 each in an area of the graphic display 1903 that is adjacent to the insertion location of the respective probes 1904, 1905. The time graphics are moved to the opposing display side to the active probe receptacles.

Figure 20:
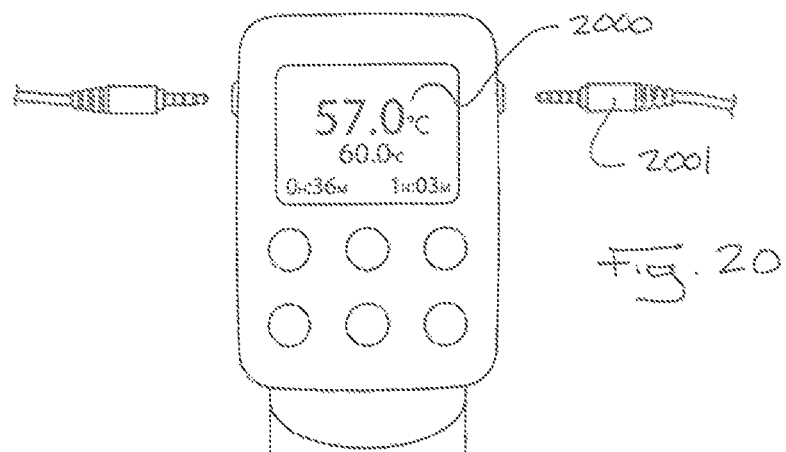
FIG. 20 is a plan view of a user interface adapted to receive jacks from two different thermal probes.
Figure 21:
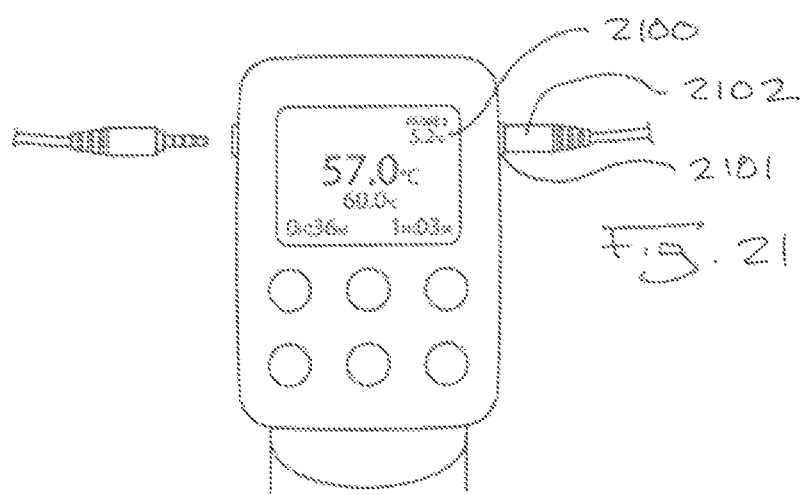
FIG. 21 is a plan view of a user interface adapted to receive jacks from two different thermal probes.
Figure 22:
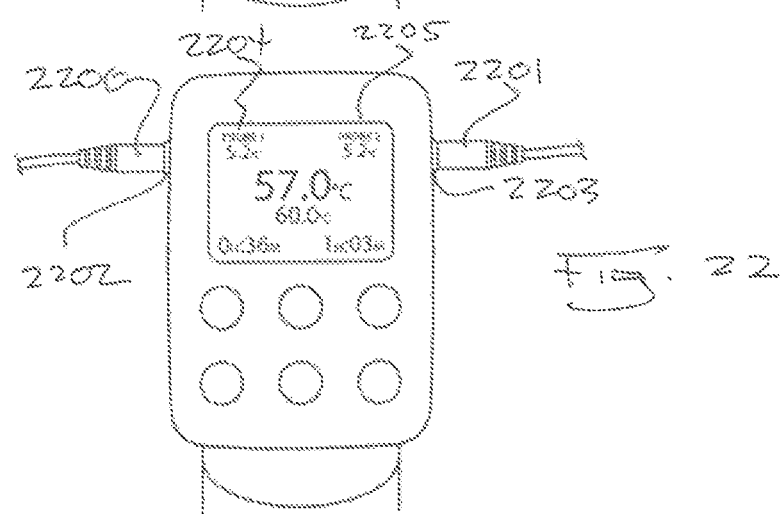
FIG. 22 is a plan view of a user interface adapted to receive jacks from two different thermal probes.

As shown in FIG. 20, the device may display temperature information 2000 generated from temperature probes located within the device. Because no external probe 2001 is connected, no information regarding the external probes is displayed. In the example of FIG. 21, a single display 2100 is generated adjacent to the receptacle opening 2101 that has received an operating probe 2102. In the example of FIG. 22, both remote probes 2200, 2201 are inserted into their receptacles 2202, 2203. The processor upon receiving information from the receptacles 2202, 2203 generates a separate display of temperature for each probe 2204, 2205. Preferably, the displays 2204, 2205 are directly adjacent to the appropriate receptacle 2202, 2203. In preferred embodiments, the graphics will re-arrange or be modified when the probe is introduced to the receptacle. For example, the temperature sensed by the probe may be displayed larger and more prominent than the bath temperature.

Figure 23:
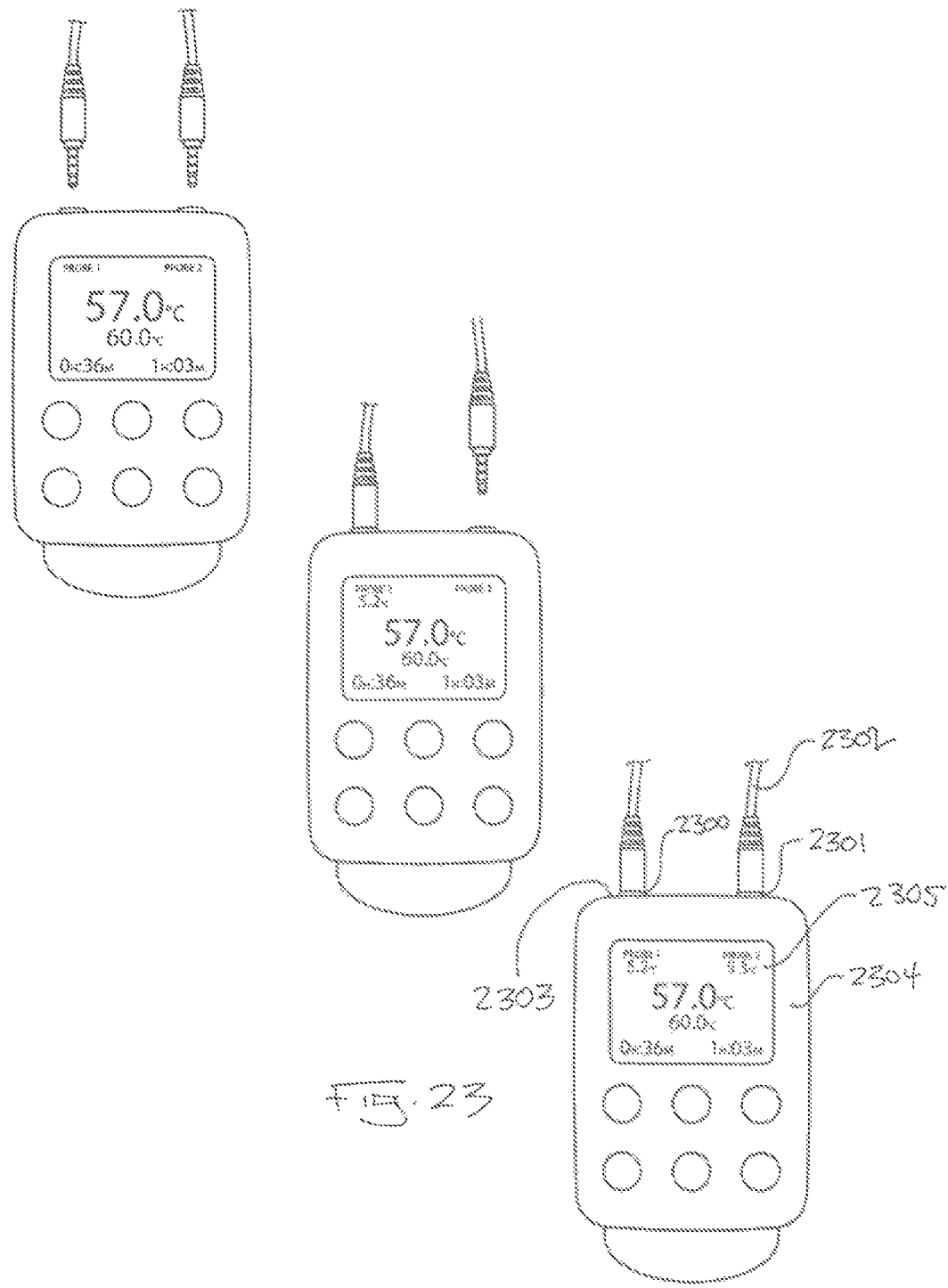
FIG. 23 is a plan view of a user interface adapted to receive jacks from two different thermal probes.

As shown in FIG. 23, the receptacles 2300, 2301 for the temperature probe jack 2302 may be located on an upper surface 2303 of the head 2304. As suggested above, upon noting the presence the jack inserted into a receptacle, the processor causes a temperature display 2305 adjacent to the corresponding probe. In preferred embodiments, a display 2305 is only created by the processor when a probe is inserted through a receptacle.

Figure 24:
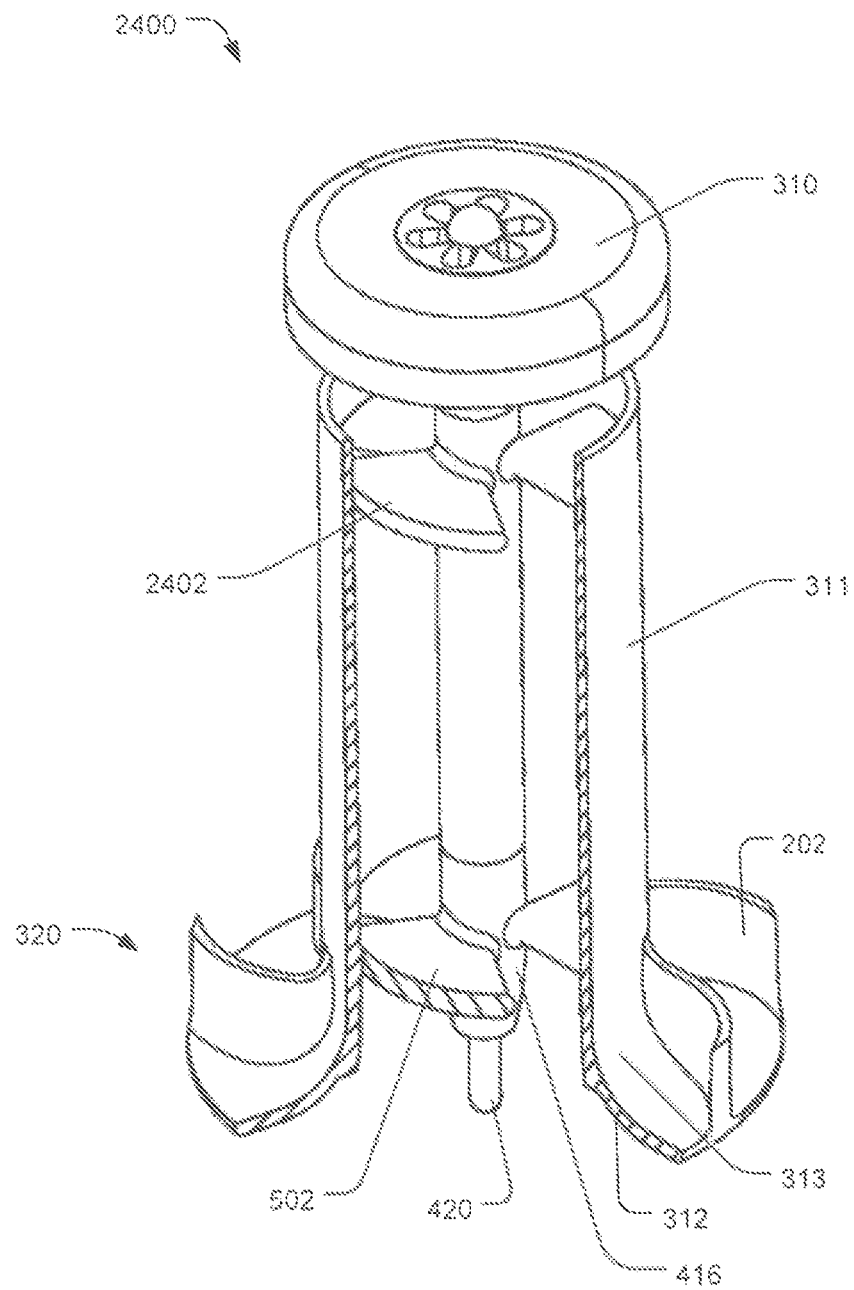
FIG. 24 is a cross-sectional view through an embodiment impeller.

FIG. 24 teaches an embodiment impeller assembly 2400 having a head 310 that defines a lower half of the magnetic coupling to a motor, a cylindrical axial partition 311 that forms a discharge impeller 320 about the lower exterior of the partition. Each vane of the impeller is integrated with a surface 313 such that the under-side surface forms a smoothly curved central intake port 312. In-current and ex-current flows are produced coaxially, which can reduce the required water draft for operation. The impeller assembly 2400 may have a second set of impeller vanes 450 that interconnect the hub 416 with the cylindrical partition 311. In this embodiment, by way of example only, a first set of fan or propeller-like vanes 502 assist in drawing or pumping liquid into the partition 311 when the impeller is rotated. The first set of vanes 502 are formed around the impeller shaft adjacent to the bearing or tip 420. In this embodiment, by way of example only, a second set of three (3) fan or propeller-like vanes 2402 are provided about the top of the partition 311 to assist in drawing or pumping liquid into the partition 311 when the impeller is rotated. It will be appreciated that, while three propeller vanes are depicted, other numbers of propeller vanes can be substituted.

Figure 25:
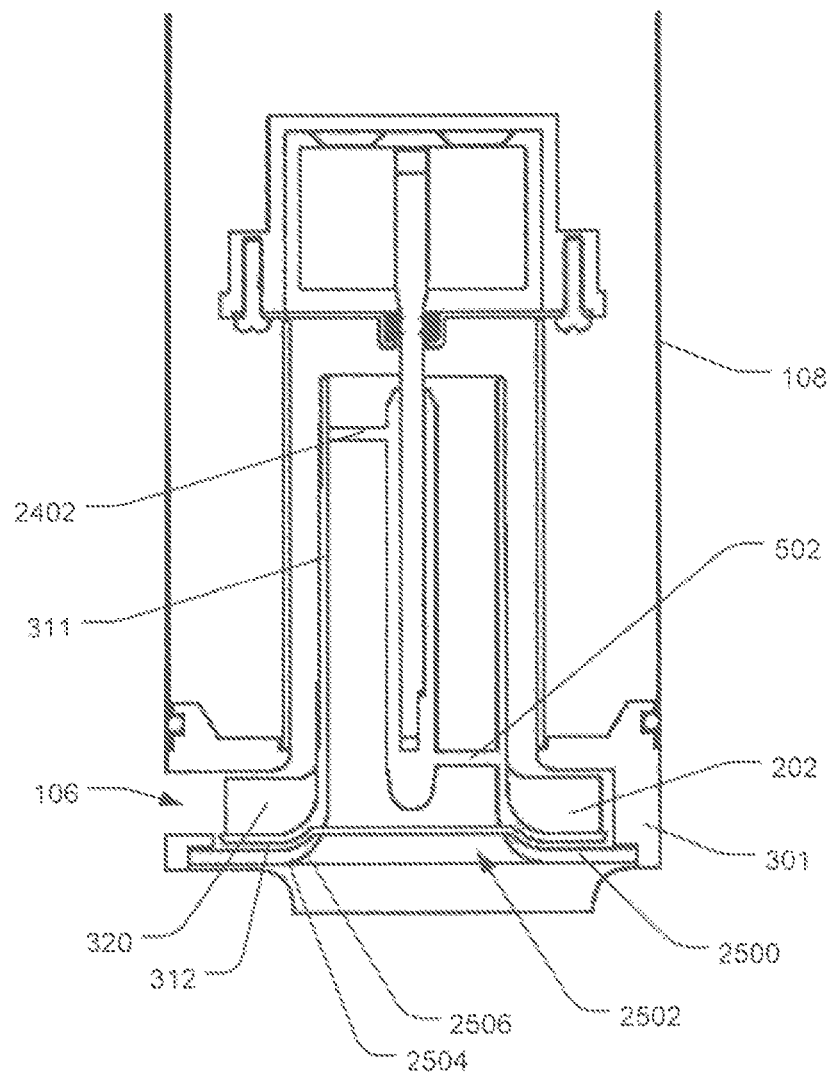
FIG. 25 is a cross-sectional view of an embodiment sous vide device.
Figure 26:
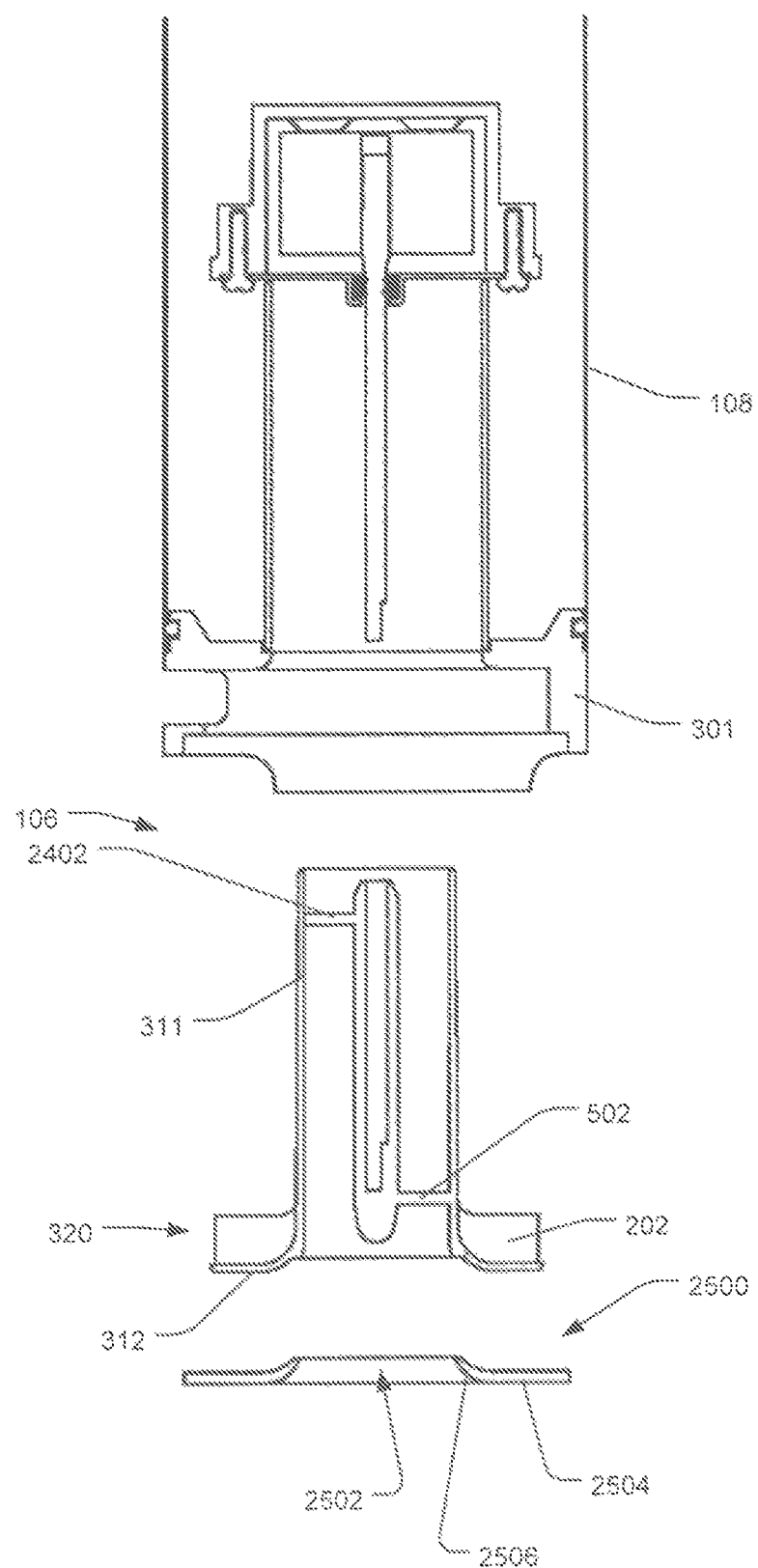
FIG. 26 is an exploded sectional view of the sous vide device of FIG. 25.

FIG. 25 and FIG. 26, teach use of a stationary disc element 2500 with an aperture 2502 that, in use, can reduce the vortex generated beneath the spinning impeller of the sous vide device. This de-vortexer element 2500 provides a stationary concentric disc with an aperture, which is supported by the foot 301 and closely spaced under the rotating impeller. This reduces an undesirable vortex forming below the axial intake. The underside or lower surface 312 of the impeller 320 is generally disc-shaped, having a smooth transition to the interior of the cylindrical partition 311. The de-vortexer element 2500 presents a substantially stationary underside for the sous vide device, with an aperture that exposes the fluid to the intake propeller vanes 502. The underside or lower surface 2504 of de-vortexer element 2500 can be contoured (e.g. at 2506) to present a curved smooth transition to the intake aperture. The technology provides an immersion type sous vide cooking device that utilises a heated element in contact with a flow path. The heated element is described as a tubular heater or heated volute. The flow path enters and exits the device from the same end, by means of a hybrid or compound impeller. The prior art devices have separate intake and output ports, located in substantially different or opposing regions of the device. The present sous vide cooking device positions intake and output ports about the distal end of the device, thereby creating two distinct advantages: the device requires a less complex sealing of internal components; and the device is able to work in shallow water to prepare custards, eggs and aspics and the like.

In some embodiments a flow path through a sous vide device has a folded or concentric flow path. It will be appreciated that, this folded path is enabled by the axial propeller which is submersed even if the water level is very low. It is this first propeller that enables the priming of the concentric path. It has a folded or concentric flow path in order to move incurrent and excurrent paths closer and enabling use in substantially shallower vessels. By way of example only, an embodiment sous vide cooking device may operate in 12.5 mm of water.

Although the invention has been described with reference to specific examples, it will be appreciated by those skilled in the art that the invention may be embodied in many other forms.

The technology provides an immersion type sous vide cooking device that utilises a tubular heater. In the present embodiments the tubular heater includes a heater in contact with a flow path. The flow path enters and exits the heater from the same end by means of a hybrid (or compound) impeller.

As used herein, unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

Reference throughout this specification to "one embodiment" or "an embodiment" or "example" means that a particular feature, structure or characteristic described in connection with the embodiment is included in at least one embodiment of the present invention. Thus, appearances of the phrases "in one embodiment" or "in an example" in various places throughout this specification are not necessarily all referring to the same embodiment or example, but may.

Furthermore, the particular features, structures or characteristics may be combined in any suitable manner, as would be apparent to one of ordinary skill in the art from this disclosure, in one or more embodiments.

Similarly it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Any claims following the Detailed Description are hereby expressly incorporated into this Detailed Description, with each claim standing on its own as a separate embodiment of this invention.

Unless specifically stated otherwise, as apparent from the following discussions, it is appreciated that throughout the specification discussions utilizing terms such as "processing," "computing," "calculating," "determining" or the like, refer to the action and/or processes of a microprocessor, controller or computing system, or similar electronic computing or signal processing device, that manipulates and/or transforms data.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Thus, while there has been described what are believed to be the preferred embodiments of the invention, those skilled in the art will recognize that other and further modifications may be made thereto without departing from the scope of the invention, and it is intended to claim all such changes and modifications as fall within the scope of the invention.

While the present invention has been disclosed with reference to particular details of construction, these should be understood as having been provided by way of example and not as limitations to the scope of the invention.

What is claimed is:

1. A sous vide device comprising:
a heater assembly,
a motor assembly comprising an electric motor,
an impeller assembly driven by the motor assembly, wherein the impeller assembly comprises a first array of radial vanes wherein the base of each radial vane is integrated with an upper surface region of the impeller assembly whose lower surface forms a smoothly curved central intake port and the array of radial vanes also serves as a discharge impeller.

2. The sous vide device according to claim 1, further comprising a magnetic coupling, wherein the motor assembly comprises a first portion of the magnetic coupling and the impeller assembly comprises a head within which is located a second portion of the magnetic coupling.

3. The sous vide device according to claim 2, wherein the second portion of the magnetic coupling comprises a circular array of magnets arranged to alternate between north and south poles facing upward.

4. The sous vide device according to claim 2, wherein the head comprises a sealed cap comprising a central opening to permit the incoming liquid's temperature to be monitored.

5. The sous vide device of claim 1, wherein the impeller assembly is capable of producing coaxially an in-current and an ex-current flow of liquid.

6. The sous vide device of claim 1, wherein the impeller assembly is isolated from an electric motor of the motor assembly by a sealed barrier or plate.

7. The sous vide device of claim 6, wherein the sealed barrier or plate comprises a dimple.

8. The sous vide device according to claim 7, wherein in a first direction the axial motion of the impeller assembly is restrained by a contact between the upper most bearing surface protrusion and the dimple.

9. The sous vide device of claim 6, wherein the sealed barrier or plate comprises an underside of which receives an upper most bearing surface protrusion of the impeller assembly.

10. The sous vide device according to claim 9, wherein in a second direction, the axial motion of the impeller assembly is restrained by a hub carried by at least one arm extending inward from an underside of a foot of the sous vide device.

11. The sous vide device according to claim 10, wherein the hub comprises a bearing or a bushing for carrying a distal tip of a shaft of the impeller assembly.

12. The sous vide device according to claim 11, wherein an outer diameter of the hub is the same as the diameter of the distal tip of the impeller assembly shaft.

13. The sous vide device according to claim 11, wherein the distal tip is provided as a terminal end of a longitudinal metal shaft carried along and within all or a part of a longitudinal extent of the impeller assembly shaft.

14. The sous vide device according to claim 11, wherein the impeller assembly shaft interconnects an impeller assembly head with the array of vanes.

15. The sous vide device according to claim 1, further comprising a plurality of ducts, wherein the plurality of ducts co-operates to provide a flow path extending from the intake port to an outlet port, wherein the ducts communicate adjacent the motor assembly.

16. The sous vide device according to claim 11, wherein the impeller assembly further comprises a second set of impeller vanes.

17. The sous vide device according to claim 16, wherein the second array set of impeller vanes interconnect the hub with the cylindrical partition of the impeller assembly.

18. The sous vide device according to claim 16, wherein the second set of impeller vanes are formed around the shaft of the impeller assembly adjacent to the uppermost bearing or distal tip, and further wherein a portion of the shaft of the impeller assembly between the second set of impeller vanes and the tip is tapered.

19. The sous vide device according to claim 1, wherein the impeller device further comprises a cylindrical partition, wherein liquid drawn into the sous vide device travels upwards through the centre of the cylindrical partition and reverses direction and flows downward, contacting the heater and scavenging the heat applied.

20. The sous vide device according to claim 1, further comprising a disc element comprising an intake aperture, wherein the disc element is capable of reducing a vortex generated by the impeller assembly.

21. The sous vide device according to claim 20, wherein the disc assembly is stationary and concentric with the aperture.

22. The sous vide device according to claim 20, wherein an underside or lower surface of the disc element is contoured to present a curved smooth transition to the intake aperture.

* * * * *